(12) United States Patent
Carney et al.

(10) Patent No.: US 11,615,352 B2
(45) Date of Patent: Mar. 28, 2023

(54) SYSTEM FOR INTEGRATING DATA USED IN COMPUTING FINANCIAL WELLBEING SCORES, AND METHODS OF SAME

(71) Applicant: IGM Financial Inc., Winnipeg (CA)

(72) Inventors: Jeffrey R. Carney, Winnipeg (CA); Douglas Milne, Toronto (CA); Gaétan Ruest, Winnipeg (CA); Michael Jack, Winnipeg (CA); Chanel Au, Winnipeg (CA); Garett K. I. Klus, Winnipeg (CA)

(73) Assignee: IGM Financial Inc., Winnipeg (CA)

( * ) Notice: Subject to any disclaimer, the term of this patent is extended or adjusted under 35 U.S.C. 154(b) by 71 days.

(21) Appl. No.: 16/590,120

(22) Filed: Oct. 1, 2019

(65) Prior Publication Data

US 2020/0104763 A1    Apr. 2, 2020

Related U.S. Application Data

(60) Provisional application No. 62/739,745, filed on Oct. 1, 2018.

(51) Int. Cl.
*G06Q 40/06* (2012.01)
*G06Q 10/04* (2023.01)
(Continued)

(52) U.S. Cl.
CPC .............. *G06Q 10/04* (2013.01); *G06N 20/00* (2019.01); *G06Q 40/02* (2013.01); *G06Q 40/12* (2013.12); *G06Q 40/06* (2013.01)

(58) Field of Classification Search
CPC ........ G06Q 10/04; G06Q 40/00; G06Q 40/02; G06Q 20/00; G06Q 40/06; G06Q 40/12
(Continued)

(56) References Cited

U.S. PATENT DOCUMENTS 5,918,217 A    6/1999 Maggioncalda et al.
7,016,870 B1 *  3/2006 Jones ...................... G06Q 40/00
                                                      705/35

(Continued)

FOREIGN PATENT DOCUMENTS

CA    2313206 A1    6/1999
CA    2455473 A1    2/2003
(Continued)

OTHER PUBLICATIONS

Bordovsky, M.; International Search Report from corresponding PCT Application No. PCT/CA2019/051405; search completed Oct. 24, 2019.

*Primary Examiner* — Ayal I. Sharon
(74) *Attorney, Agent, or Firm* — Christopher N. Hunter; Laurie Wright; Blake, Cassels & Graydon LLP

(57) ABSTRACT

A system and method are provided for integrating data used in computing financial wellbeing scores. The system includes at least one computing device configured to provide a computing platform, the computing platform providing: at least one client module providing an interface for communicating with client devices; an advisor module providing an interface for communicating with advisor devices; a forecast module; an optimizer module configured to analyze datasets from multiple sources and to generate recommendations to optimize strategies to achieve financial outcomes; and a database storing financial planning data. The system also includes an integration layer interposed between the computing platform and a book of record to enable client data in the book of record to be accessed; and a financial planning software module independent of the computing platform, configured to generate financial plan data integrated by the computing platform in financial wellbeing scores and recommendations. The computing platform is configured to, in real time: access data from the book of record and obtain (Continued)

data generated by the financial planning software, to generate a financial wellbeing score for the client module or the advisor module being accessed by a respective device.

23 Claims, 50 Drawing Sheets

(51) Int. Cl.
  *G06Q 40/12* (2023.01)
  *G06N 20/00* (2019.01)
  *G06Q 40/02* (2023.01)
(58) Field of Classification Search
  USPC .......................................................... 705/35
  See application file for complete search history.

(56) References Cited

U.S. PATENT DOCUMENTS

| | | |
|---|---|---|
| 7,577,597 B1 | 8/2009 | Allison et al. |
| 7,818,233 B1 | 10/2010 | Sloan et al. |
| 7,921,048 B2* | 4/2011 | Sloan .................. G06Q 40/02 705/36 R |
| 8,112,332 B1* | 2/2012 | Garcia .................. G06Q 40/06 705/35 |
| 8,150,750 B2* | 4/2012 | Ray ...................... G06Q 10/10 705/35 |
| 8,341,057 B1* | 12/2012 | Wagner ................ G06Q 40/02 705/36 R |
| 9,424,609 B2* | 8/2016 | Keld .................... G06Q 20/102 |
| 2002/0002521 A1* | 1/2002 | Shearer ................ G06Q 40/04 705/36 R |
| 2002/0095363 A1* | 7/2002 | Sloan .................... G06Q 40/02 705/36 R |
| 2003/0126054 A1* | 7/2003 | Purcell, Jr. ............ G06Q 40/06 705/36 R |
| 2004/0054610 A1* | 3/2004 | Amstutz ................ G06Q 40/02 705/36 R |
| 2006/0074788 A1 | 4/2006 | Grizack et al. |
| 2007/0168302 A1* | 7/2007 | Giovinazzo ........... G06Q 40/06 705/36 R |
| 2007/0226123 A1* | 9/2007 | Lutnick ................ G06Q 40/04 705/37 |
| 2014/0136383 A1* | 5/2014 | Wright .................. G06Q 40/06 705/35 |
| 2014/0207638 A1 | 7/2014 | Janiczek |
| 2014/0372340 A1* | 12/2014 | Brown, III ............ G06Q 40/06 705/36 R |
| 2016/0110813 A1* | 4/2016 | Hayden ................ G06Q 40/06 705/36 R |
| 2019/0180358 A1* | 6/2019 | Nandan ................ G06K 9/6269 |
| 2020/0104935 A1* | 4/2020 | Schmitt ................ G06Q 40/06 |
| 2021/0073909 A1* | 3/2021 | Le Roux ............... G06N 20/00 |
| 2022/0101383 A1* | 3/2022 | Bloom .................. G06Q 50/01 |

FOREIGN PATENT DOCUMENTS

| | | |
|---|---|---|
| CA | 2456742 A1 | 2/2003 |
| WO | 2018/098581 A1 | 6/2018 |

* cited by examiner

Optimizing for retirement

We want to better assess your retirement needs. To begin, how old are you?

48

<Back  Next >

FIG. 14(a)

Optimizing for retirement

Have you retired?

No >

<Back  Next >

FIG. 14(b)

Optimizing for retirement

When do you plan to retire?

60

<Back  Next >

FIG. 14(c)

Optimizing for retirement

How much of your total savings is currently allocated to retirement?

$250,001-$400,000 >

<Back  Next >

FIG. 14(d)

($) Optimizing for retirement

What is your annual household income before taxes?

$210000

<Back    Next >

FIG. 14(j)

($) Optimizing for retirement

How much do you spend, on average, per month, excluding mortgage debt and other loans? (Includes: rent, cell phone, internet, food, etc.)

$6,001-$18,000 >

<Back    Next >

FIG. 14(i)

($) Optimizing for retirement

Do you currently work with IG Consultant?

No, I don't have a financial advisor >

<Back    Next >

FIG. 14(k)

Preparing for unexpected
Do you have term life insurance?

[ Yes - Personal ⌄ ]

< Back    [ Next > ]

FIG. 17(a)

Preparing for unexpected
Do you have permanent life insurance?

[ Yes ⌄ ]

< Back    [ Next > ]

FIG. 17(b)

Preparing for unexpected
Do you have mortgage insurance?

[ No ⌄ ]

< Back    [ Next > ]

FIG. 17(c)

Preparing for unexpected
Do you have disability insurance?

[ No ⌄ ]

< Back    [ Next > ]

FIG. 17(d)

Preparing for unexpected

Which aspects of your estate plan are currently up to date?
Check all that apply

- Will
- Power of Attorney
- Beneficiary designations on investments, pensions, and insurance policies
- None ◄ Back    Next ►

FIG. 17(f)

Preparing for unexpected

Do you have critical illness insurance?

- No ▾

◄ Back    Next ►

FIG. 17(e)

Preparing for unexpected

How would you fund an unexpected expense?
Check all that apply

- Emergency Funds
- Existing line of credit
- Credit cards
- Sell assets
- Retirement savings
- Help from friends or family
- None ◄ Back    Next ►

FIG. 17(g)

Sharing your wealth
How do you plan to eventually share your wealth?
Check all that apply

- Leave an estate to children or others
- Give to charity
- None

< Back  Next >

FIG. 18(a)

Sharing your wealth
Which aspects of your estate plan are currently up to date?
Check all that apply

- Will
- Power of Attorney
- Beneficiary designations on investments, pensions, and insurance policies
- None < Back  Next >

FIG. 18(b)

Sharing your wealth
Have you created a wealth transfer plan?

No >

< Back  Next >

FIG. 18(c)

Sharing your wealth
Which of the following assets or accounts might you use to help you leave an inheritance?
Check all that apply

- Investments and savings
- Real property and other assets
- Trusts
- _____ for insurance
- None < Back  Next >

FIG. 18(d)

Sharing your wealth

When thinking about charitable giving, have you done the following, either on your own or with a financial advisor? Check all that apply

- Discussed with family About leaving assets to charities or leaving a legacy
- Evaluated the tax efficiency of your gift-giving
- Devised gifts from estate have been clearly stated in your will
- Set up a private foundation or donor-advised fund
- None ◀ Back    Next ▶

Sharing your wealth

Do you have access to a donation matching program at work?

[ I have access to this benefit and don't use it ▼ ]

◀ Back    Next ▶

Sharing your wealth

Does your work allow you to take paid time off to volunteer?

[ I do not have access to this benefit ▼ ]

◀ Back    Next ▶

Sharing your wealth

Do you donate as much as you would like to?

[ I would like to donate more ▼ ]

◀ Back    Next ▶

FIG. 18(h)

Managing your Cash Flow Efficiently

Because of my money situation, I feel like I will never have the things I want in life.

How well does this statement reflect your feelings?

Somewhat ∨

< Back    Next >

FIG. 19(a)

Managing your Cash Flow Efficiently

I am just getting by financially.

How well does this statement reflect your feelings?

Somewhat ∨

< Back    Next >

FIG. 19(b)

Managing your Cash Flow Efficiently

I am concerned that the money I have or will save won't last.

How well does this statement reflect your feelings?

Very Well ∨

< Back    Next >

FIG. 19(c)

Managing your Cash Flow Efficiently

I have money left over at the end of the month.

How well does this statement reflect your feelings?

Somewhat ∨

< Back    Next >

FIG. 19(d)

Managing your Cash Flow Efficiently

My finances control my life.
How well does this statement reflect your feelings?

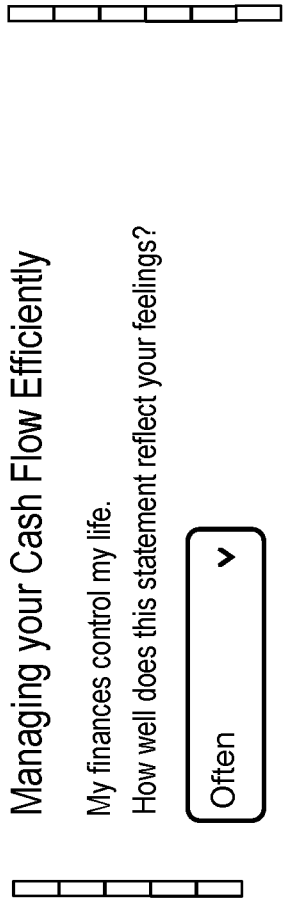

FIG. 19(e)

Managing your Cash Flow Efficiently

In the last 12 months, have you made any deposits into your savings accounts or contributed to your investments?

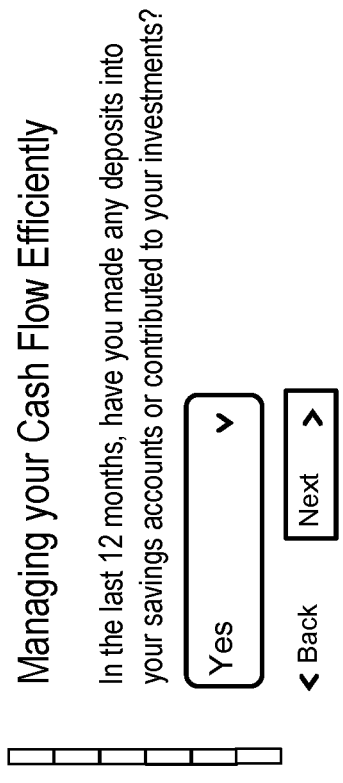

FIG. 19(f)

Managing your Cash Flow Efficiently

Have you created a budget to help track your day-to-day expenses?

FIG. 19(g)

Managing your Cash Flow Efficiently

Do you anticipate making, or are you making, mortgage payments during retirement?

FIG. 19(h)

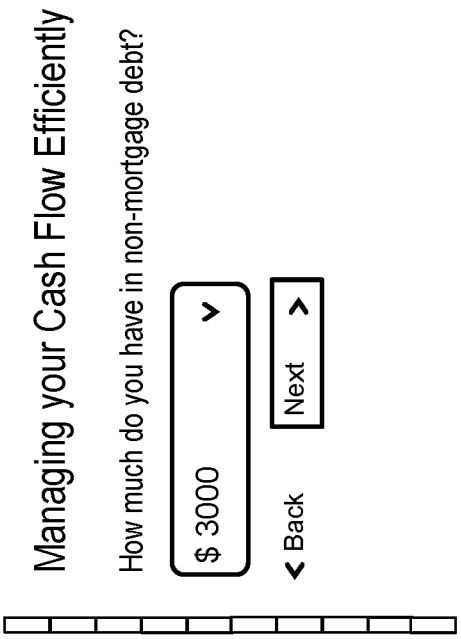
FIG. 19(i)
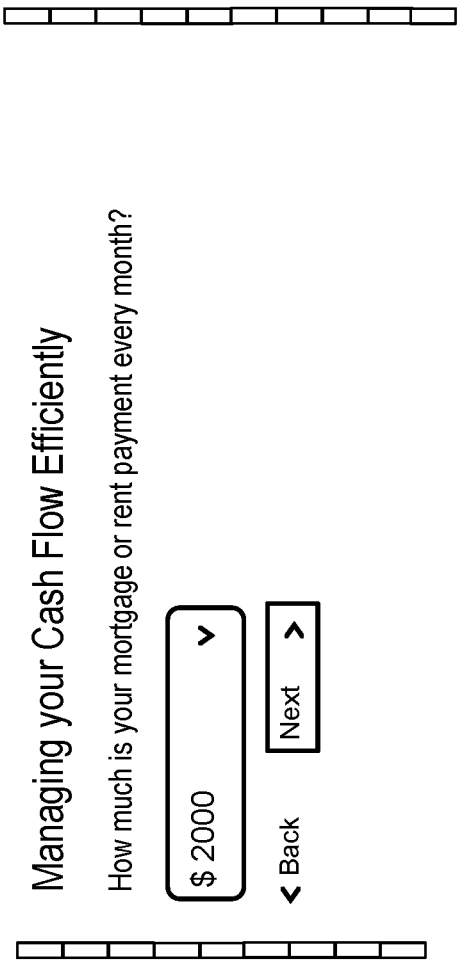
FIG. 19(j)
FIG. 19(k)

Planning for Major Expenditures

Are you saving for any of the following expenses?

- Child's education
- A major purchase
- Paying off debt
- None

< Back  Next >

FIG. 20(a)

Planning for Major Expenditures

How many children do you have?

3

< Back  Next >

FIG. 20(b)

Planning for Major Expenditures

In what year do you expect your first child to begin their post-secondary education?

2027

< Back  Next >

FIG. 20(c)

Planning for Major Expenditures

Do you expect your children to live at home while attending school?

No ▼

< Back  Next >

FIG. 20(d)

Planning for Major Expenditures

How much do you expect to spend annually on education per child? Include tuition, books and other non-educational costs.

[ $22000 ]

< Back    Next >

FIG. 20(e)

Planning for Major Expenditures

How much have you saved so far?

[ $74000 ]

< Back    Next >

FIG. 20(f)

Planning for Major Expenditures

How much are you saving, or do you plan on saving, per year towards this expense?

[ $400 ]

< Back    Next >

FIG. 20(g)

Planning for Major Expenditures

Which of the following accounts are you currently using, or do you plan on using to help save for your child's education.

[ RESP  v ]

< Back    Next >

FIG. 20(h)

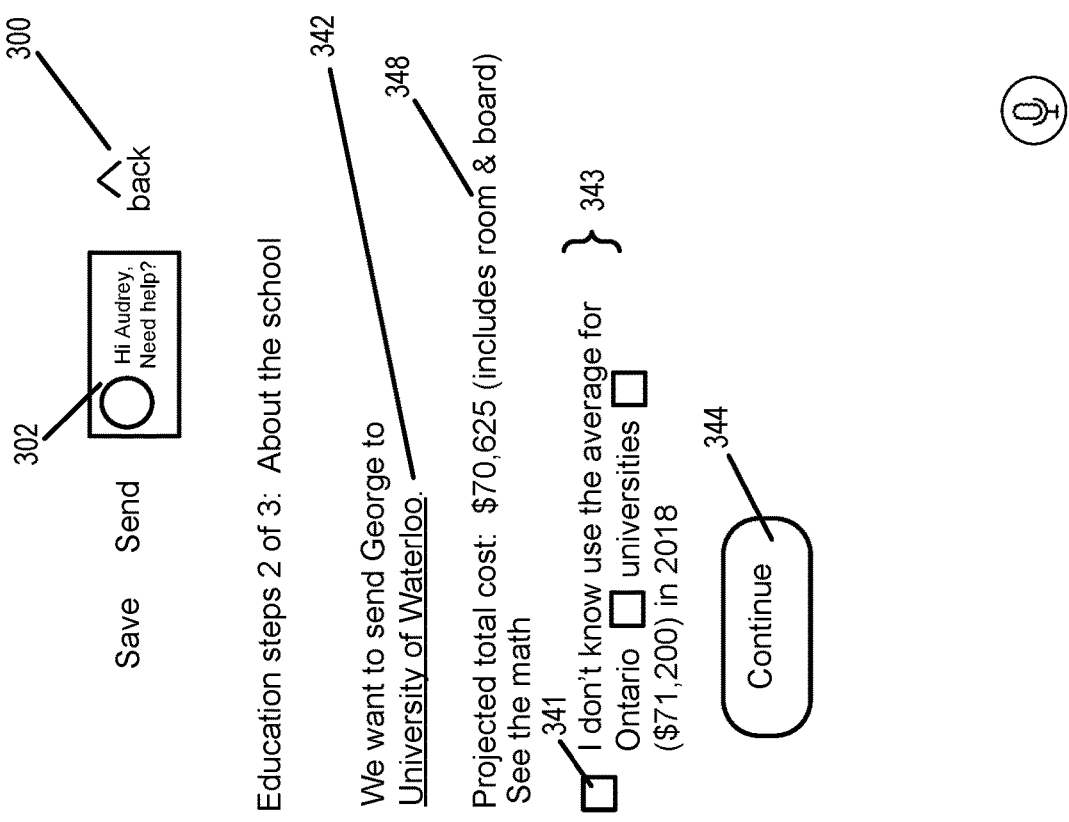
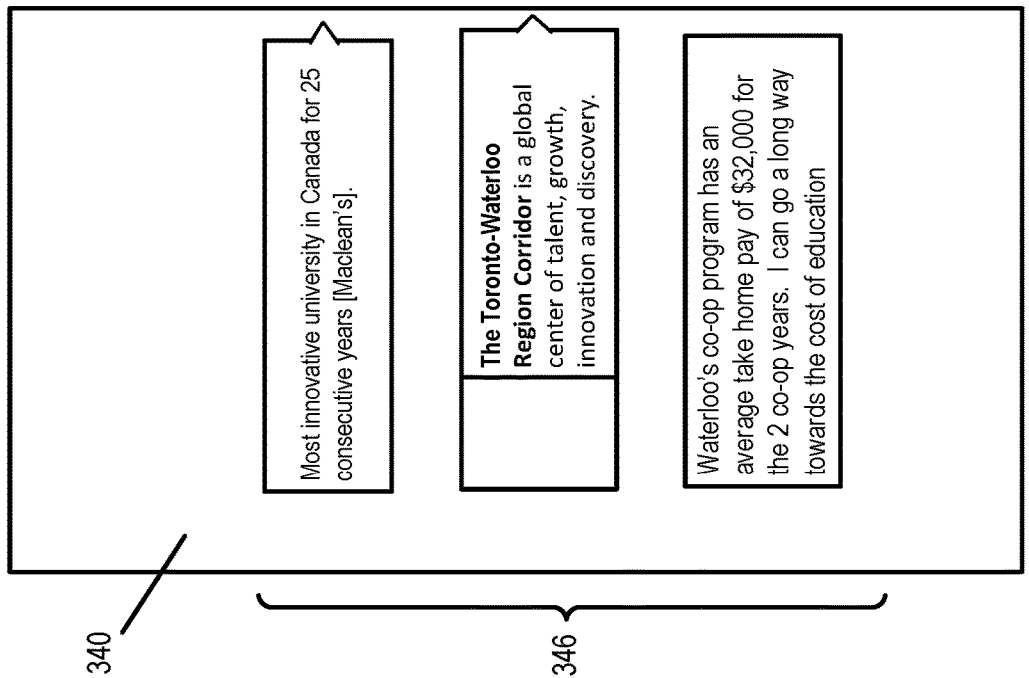
FIG. 21

FIG. 23(a)
FIG. 23(b)
FIG. 23(c)
FIG. 23(d)

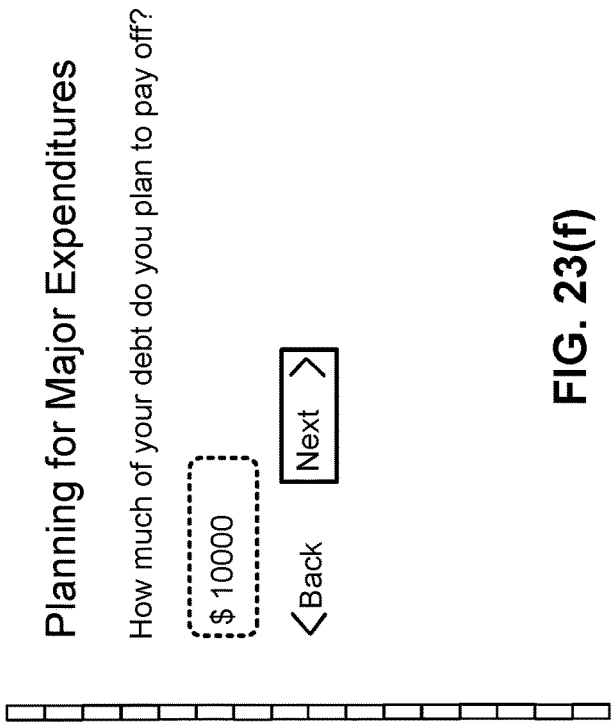
FIG. 23(e)
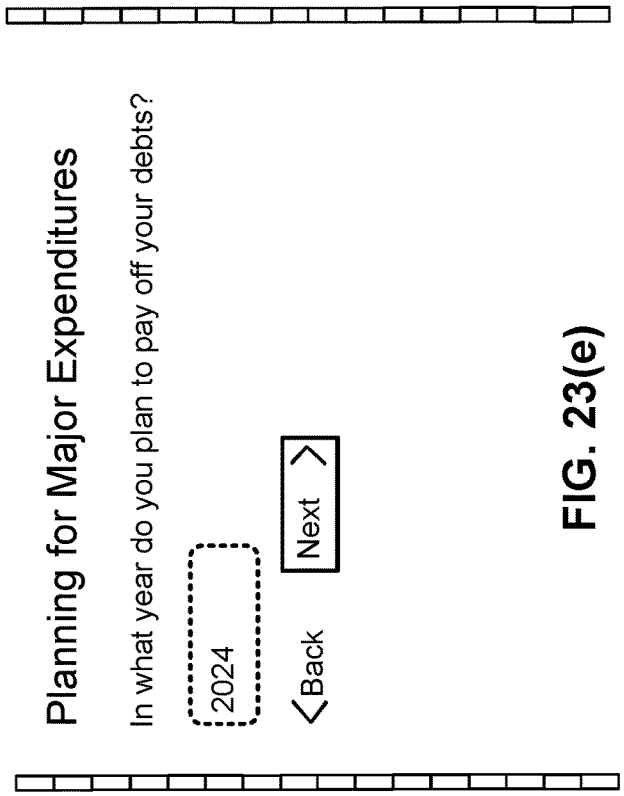
FIG. 23(f)
FIG. 23(g)

Optimizing for Retirement

Preparing for the Unexpected

Sharing Your Wealth

Managing Your Cash Flow Efficiently

Planning for Major Expenditures

Ready to embrace all of life's opportunities?

Send us your feedback

Connect with us

And voila, here's your score.

65

Out of 200

▷ Save my progress

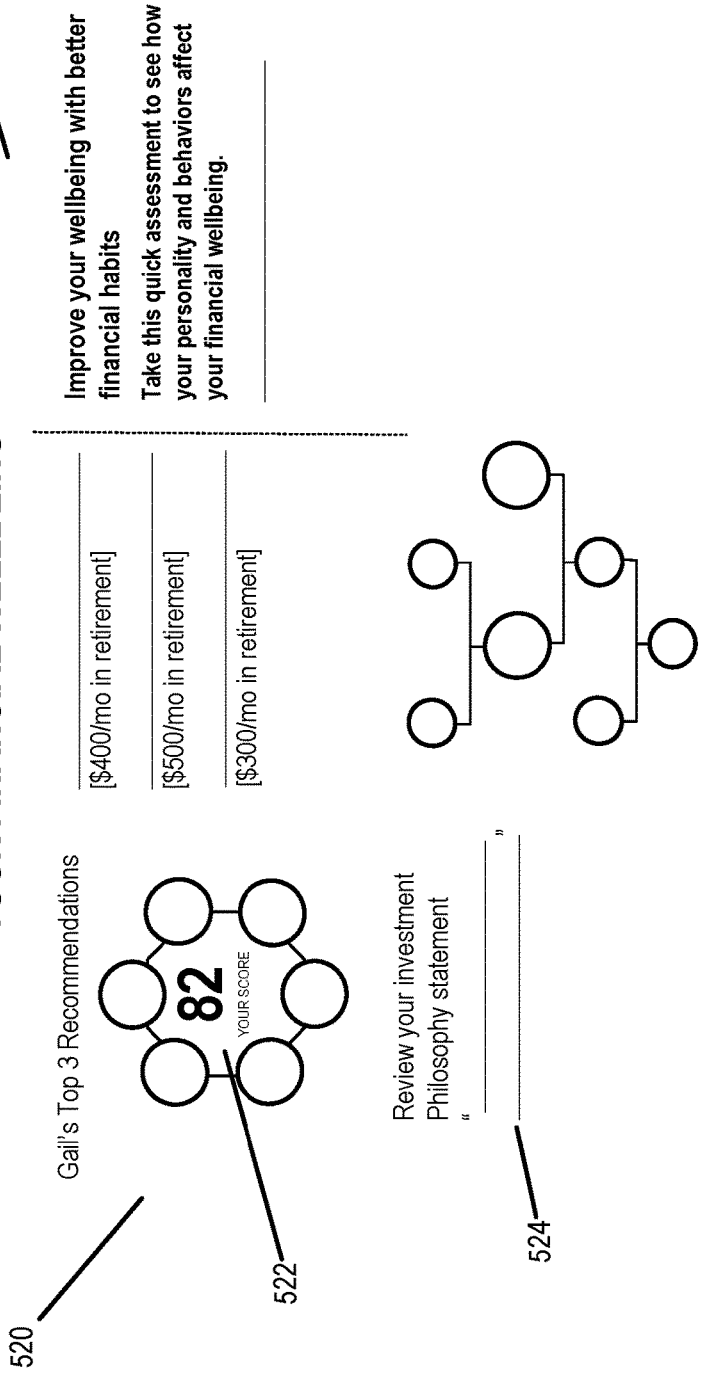
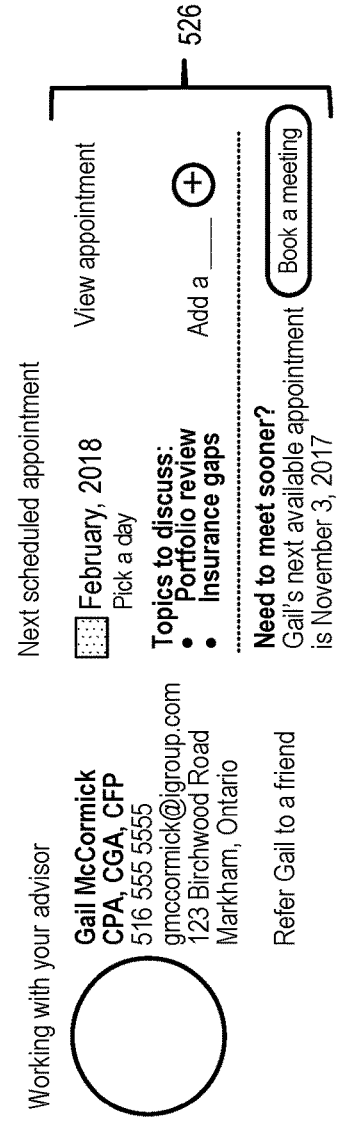
FIG. 27(b)

FIG. 30(b)

Accounts Goals My Plan  Articles  ○ My advisor Gail McCormick  ☎ Call

PROPOSED PLAN UPDATES
December 24, 2017 | Prepared by Gail McCormick

RECOMMENDED ACTIONS

> Retire at age 60 using tax effective income strategy to maintain after-tax income according to the plan.

> Revise Estate plan target to $700,000; explore funding with Whole Life to reduce tax on estate.

> Reallocate funds from "Replace Eugene's Benz" to retirement plan

> Get quotes for life annuity (joint ____) for $2,000 per month

> Look at incorporating LTC insurance into financial plan

— 562

☑ I have reviewed and understand this proposal

☑ I give my advisor permission to initiate the approved plan updates

— 564

( Approve changes )    Cancel

— 566

🗋 My documents

NEW

Proposed plan updates
December 27, 2017
Requires your signature

OTHER DOCUMENTS

Benz goal proposal
December 23, 2017

Annual plan status
December 3, 2017

FIG. 31

SYSTEM FOR INTEGRATING DATA USED IN COMPUTING FINANCIAL WELLBEING SCORES, AND METHODS OF SAME

CROSS-REFERENCE TO RELATED APPLICATION(S)

This application claims priority to U.S. Provisional Patent Application No. 62/739,745 filed on Oct. 1, 2018, the contents of which are incorporated herein by reference.

TECHNICAL FIELD

The following relates to systems and methods for integrating data used in computing financial wellbeing scores, for example, in predicting the probability of an individual achieving one or more financial goals, and/or for managing financial goals and financial plans based on the individual's financial situation.

BACKGROUND

Individuals earning an income generally implement a savings strategy to work towards one or more goals, for example retirement, vacations, or funding a dependent's education. An individual may hire a financial advisor to develop a financial strategy based on their unique financial situation and needs.

Financial advisors have traditionally provided services to clients in person, requiring the client to request an appointment and travel to an office. This causes challenges to arise for busy clients whose schedules conflict with the advisor's availabilities, or clients with mobility issues and/or clients in remote areas who have difficulty travelling to the advisor's office.

A client wishing to make a modification to their financial plan, for example retiring one year earlier, may find it difficult to visualize or understand the effect of the modification on their plan or how it impacts their ability to meet their goals. Additionally, a client who wishes to quickly check the effect of a hypothetical modification to their plan, for example checking if it is possible to purchase a new car without needing to retire at a later date, may want to know the result immediately, instead of waiting for an appointment with an advisor.

A prospective client who has not yet hired a financial advisor may not have the tools available to fully understand their financial situation and set realistic financial goals. Such an individual may not be aware that their goals are unattainable, and as such would not approach a financial advisor for advice on how to modify their financial strategy to meet those goals or select achievable goals.

It is an object of the following to address at least one of the above-noted disadvantages.

SUMMARY

In one aspect, there is provided a system for integrating data used in computing financial wellbeing scores, the system comprising: at least one computing device configured to provide a computing platform, the computing platform providing: at least one client module providing an interface for communicating with client devices; an advisor module providing an interface for communicating with advisor devices; a forecast module; an optimizer module configured to analyze datasets from multiple sources and to generate recommendations to optimize strategies to achieve financial outcomes; and a database storing financial planning data; an integration layer interposed between the computing platform and a book of record to enable client data in the book of record to be accessed; and a financial planning software module independent of the computing platform, configured to generate financial plan data integrated by the computing platform in financial wellbeing scores and recommendations; wherein the computing platform is configured to, in real time: access data from the book of record and obtain data generated by the financial planning software, to generate a financial wellbeing score for the client module or the advisor module being accessed by a respective device.

In another aspect, there is provided a method for integrating data used in computing financial wellbeing scores, the method comprising: using at least one computing device to provide a computing platform, the computing platform providing: at least one client module providing an interface for communicating with client devices; an advisor module providing an interface for communicating with advisor devices; a forecast module; an optimizer module configured to analyze datasets from multiple sources and to generate recommendations to optimize strategies to achieve financial outcomes; and a database storing financial planning data; providing an integration layer interposed between the computing platform and a book of record to enable client data in the book of record to be accessed; enabling access to a financial planning software module independent of the computing platform, configured to generate financial plan data integrated by the computing platform in financial wellbeing scores and recommendations; operating the computing platform in real time to: access data from the book of record and obtain data generated by the financial planning software, and generate a financial wellbeing score for the client module or the advisor module being accessed by a respective device.

In yet another aspect, there is provided a non-transitory computer readable medium comprising computer executable instructions for: using at least one computing device to provide a computing platform, the computing platform providing: at least one client module providing an interface for communicating with client devices; an advisor module providing an interface for communicating with advisor devices; a forecast module; an optimizer module configured to analyze datasets from multiple sources and to generate recommendations to optimize strategies to achieve financial outcomes; and a database storing financial planning data; providing an integration layer interposed between the computing platform and a book of record to enable client data in the book of record to be accessed; enabling access to a financial planning software module independent of the computing platform, configured to generate financial plan data integrated by the computing platform in financial wellbeing scores and recommendations; operating the computing platform in real time to: access data from the book of record and obtain data generated by the financial planning software, and generate a financial wellbeing score for the client module or the advisor module being accessed by a respective device.

BRIEF DESCRIPTION OF THE DRAWINGS

Embodiments will now be described with reference to the appended drawings wherein:

FIGS. 12(a), 12(b), 13(a), 13(b), 14(a) to 14(k), 15, 16, 17(a) to 17(g), 18(a) to 18(h), 19(a) to 19(k), 20(a) to 20(h), 21, 22(a), 22(b), 23(a) to 23(g), 24, 25, and 26 are screen shots from an example of a prospective client user interface displayed on an electronic device;

FIGS. 27(a), 27(b), 28(a), 28(b), 29(a) and 29(b) are screen shots from an example of an active client user interface displayed on an electronic device during the modification of a saving plan and savings goals;

FIGS. 30(a) through 30(c) are screen shots from an example of an advisor user interface displayed on an electronic device during the proposal of a modified saving plan; and FIGS. 31 through 33 are screen shots from an example of an active client user interface displayed on an electronic device during the acceptance and verification of the modified saving plan.

DETAILED DESCRIPTION

The following provides a system that integrates data from multiple sources, in real time, to compute financial wellbeing scores. The system includes at least one computing device that provides a computing platform to enable users to interface with the system and to implement the methods described herein.

For example, the computing platform can provide client and/or advisor modules for interfacing with users, including active or prospective clients and advisors, to integrate multiple data sources and tools in order to generate financial plans, financial wellbeing scores, and recommendations for improving such scores. For instance, the computing platform can be used for predicting the probability that an individual achieves one or more financial goals when implementing a financial plan, and managing the plan based on the individual's changing goals and evolving circumstances. The system can also be used for recommending actions to improve the probability of achieving goals when an individual's financial situation and/or goals change. The computing platform can also leverage data analytics, machine learning, and other algorithms to identify similar clients, conduct comparisons and optimizations, and perform reassessments, in real time, via a respective portal into the system. In this way, clients (or brokers/consultants on behalf of clients) and advisors can electronically and remotely initiate complex financial planning operations to generate data that can be used to achieve financial goals, and to reassess and change same, without the time consuming manual processes currently required. By leveraging existing financial planning software and obtaining access to data sources in real time, the computing platform can integrate these multiple data sources in a real time assessment via a suitable portal or online module.

Figure 1:
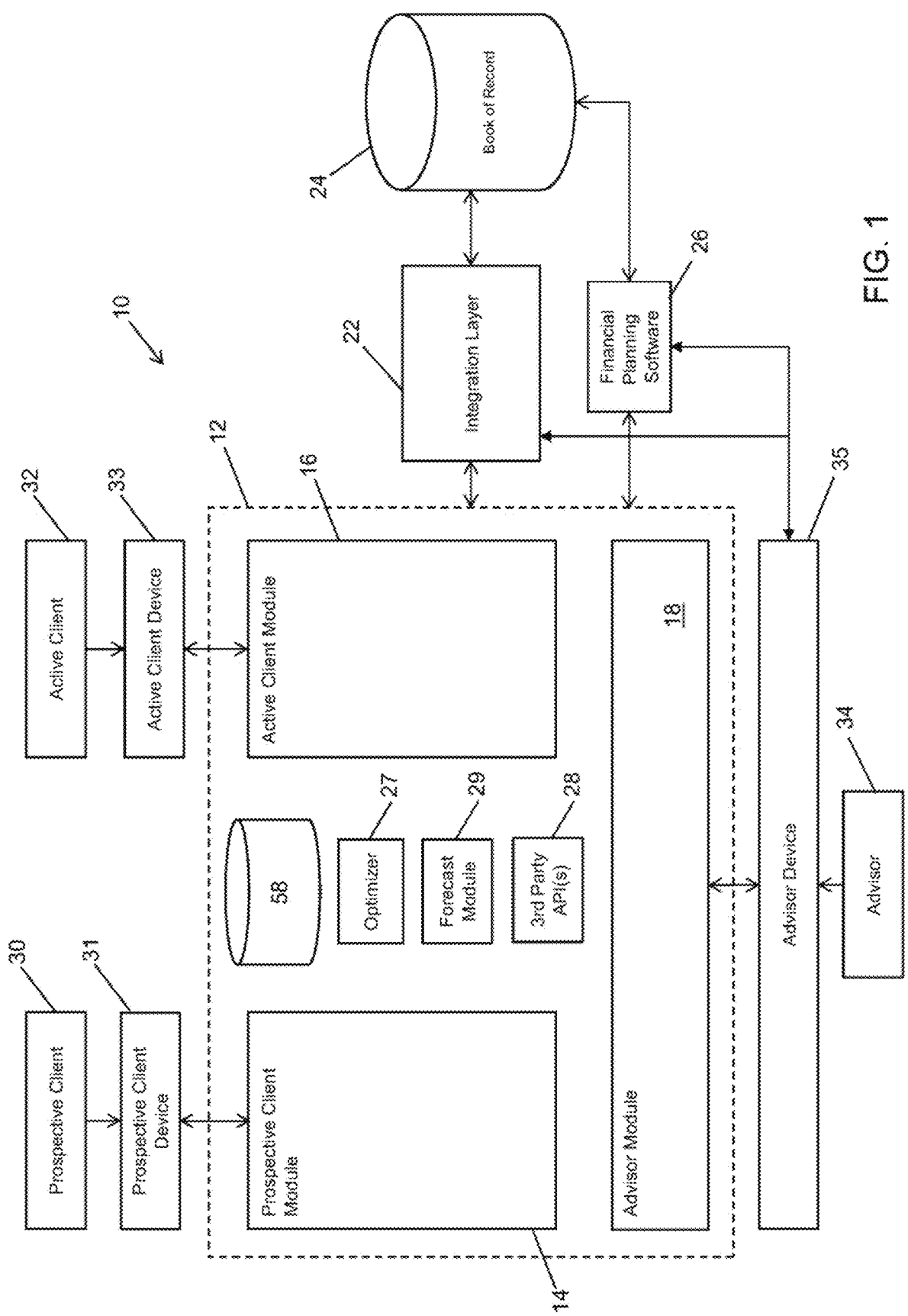
FIG. 1 is a schematic block diagram of a computing platform that can be used to predict the probability of an individual meeting financial goals and enable an advisor to manage the individual's strategy to achieve those goals and to optimize the strategy to achieve those goals.

Turning now to the figures, FIG. 1 schematically illustrates a financial planning system 10. The system 10 includes at least one computing device such as a server device to provide a computing platform 12. The computing platform 12 creates an ecosystem or environment for clients, advisors, administrators, and other parties to provide access to data and information necessary in real time to conduct the analyses and generate the scores and recommendations described herein.

The platform 12 in this example includes a prospective client module 14, an active client module 16, and an advisor module 18. By providing the platform 12 and the modules 14, 16, 18, the system 10 enables both prospective clients 30 and active clients 32 an environment in which to initiate the computation of financial wellbeing scores and recommendations that can be used by such entities to determine the probability of achieving one or more financial goals and/or a personalized financial plans. Financial goals are large future expenditures that may require long-term savings, for example a new car, university tuition, or retirement. A financial plan is understood herein to be a description and illustration of the strategy and activities recommended to an individual or household to achieve their financial goals, and can include any or all of a cash management component, a budgeting component, an insurance component, a savings component, an investment component, a tax component, a charitable giving component and/or an estate planning component.

The system 10 is configured to integrate several sources of data and data inputs to automatically, and in real time, calculate the probability of achieving the one or more financial goals and develop the personalized financial plan. The system 10 may also be configured to compile information from the prospective client 30 or active client 32 for analysis by an advisor 34. The system 10 may alternatively be configured to partially analyze information collected from the prospective client 30 or active client 32 for further analysis by the advisor 34. As described in greater detail below, the system 10 is also configured to compile partial information from a prospective client 30 or active client 32, compare that information to one or more databases or sources of information, and use comparable information to augment the information used by the system 10 or the advisor 34 for conducting an analysis.

The platform 12 communicates with devices such as a prospective client device 31, an active client device 33, and an advisor device 35, which comprise devices such as computers, tablets, mobile devices, etc. It can be appreciated that only one prospective client device 31, one active client device 33, and one advisor device 35 are shown for ease of illustration, but typically several or many devices 31, 33, 34 would be communicable with the platform 12.

The system 10 can be accessed by a prospective client 30 using the prospective client device 31, can be accessed by an active client 32 using the active client device 33, and/or accessed by an advisor 34 using the advisor device 35. The system 10 can be accessed using any suitable medium that enables user interactivity with a corresponding module within the platform 12, such as an app or web browser. Herein an exemplary medium is a user interface (U I) provided by way of a web browser and can be integrated with or otherwise communicable with one or more server-sided entities or services that enable provision, dissemination, tracking, and communications within a platform or system level environment.

The platform 12 hosts or otherwise includes a prospective client module 14, an active client module 16, and an advisor module 18, as descried in greater detail below. The advisor module 18 is in communication with the prospective client module 14 and the active client module 16. It can be appreciated that the components shown within the platform 12 in FIG. 1 can include communication connections therebetween and are shown in isolation for ease of illustration. The platform 12 can also utilize a number of Application Program Interface (APIs) 28 in order to interact with third party applications, for example other financial management applications or applications for collecting social media or other publicly available information.

The platform 12 additionally communicates with an integration layer 22, which provides access to a book of record 24. The integration layer 22 enables the platform 12 to read from the book of record 24 to obtain, or obtain access to, specific information already captured about a prospective client 30 or active client 32. The integration layer 22 can also enable the platform 12 to write to the book of record 24 additional information collected about the prospective or active client 30, 32. In this example, the book of record 24 is a database comprising active client information, prospective client information, advisor information, and relationship data indicative of relationships between these parties (e.g., what clients are connected to which advisors, which clients are connected to which other clients, and how). Any information can be stored in the book of record 24, such as their financial history, demographic information, etc. Information required by the prospective client module 14, active client module 16, or advisor module 18 can be provided to the platform 12 by the book of record 24 through the integration layer 22.

In order to enable the real time computation of a financial wellbeing score, financial plan, and/or recommendations for improving same, the platform 12 coordinates and integrates the execution of various modules and access to various data sources as shown in FIG. 1. In addition to providing interfaces with users, via the prospective client module 14, active client module 16, and advisor module 18, the platform 12 interfaces with the integration layer 22 as indicated above, to leverage existing data for clients, stored and independently updated and maintained in the book of record 24. Additionally, the platform 12 is configured to maintain a database 58 of financial planning related information discussed in greater detail below. The platform 12 also includes an optimizer 27, which is configured to analyze, compute, compare, and generate financial plans and financial well being scores in multiple different scenarios as discussed later. The platform 12 can also include a forecast module 29 for generating forecast information, such as future cashflows that depend on selected scenarios. It can be appreciated that the forecast module 29 may instead be provided by financial planning software 26 that in this example is an independent and separate software tool within the system 10 for which the platform 12 has access.

Figure 8:
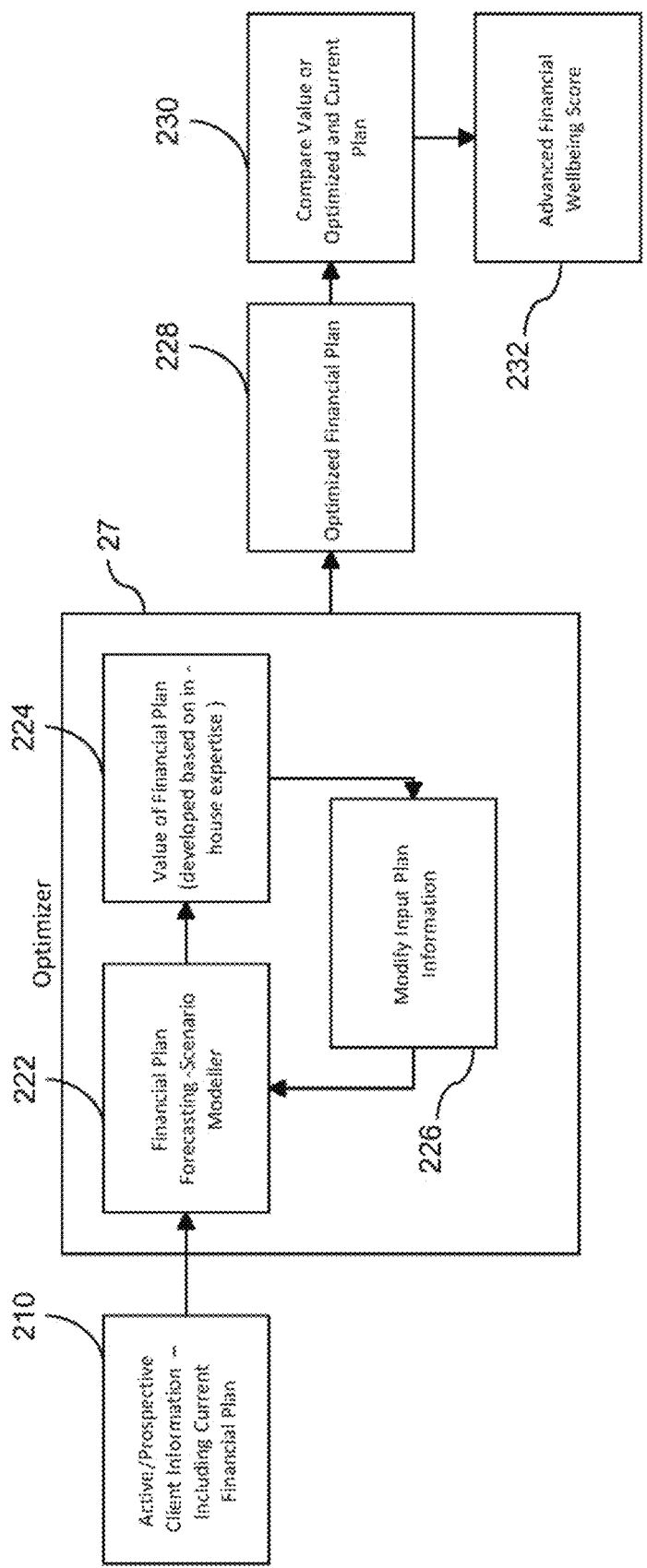
FIG. 8 is a flow chart illustrating an optimized assessment and scoring process.
Figure 9:
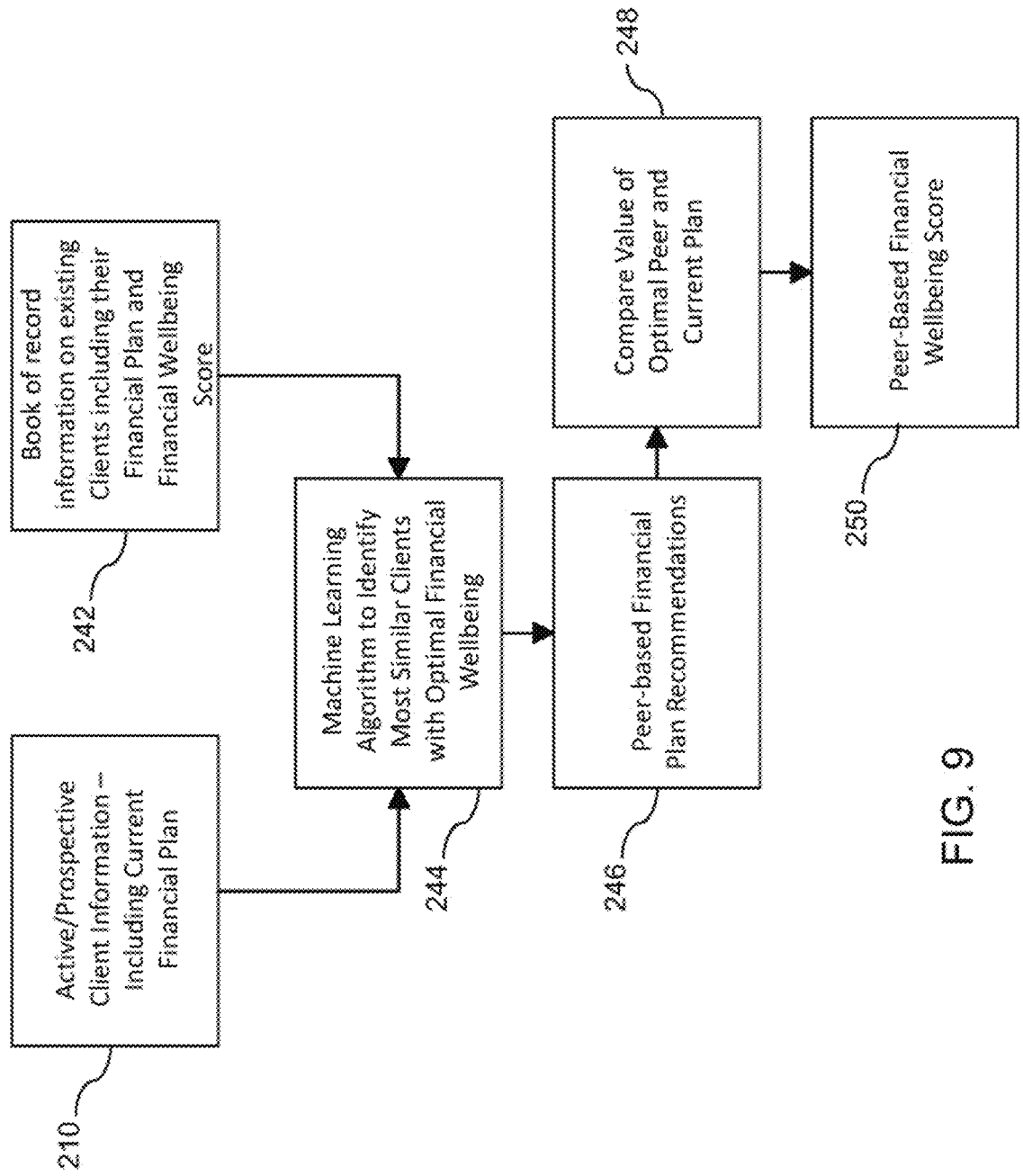
FIG. 9 is a flow chart illustrating a peer-based assessment and scoring process.

The financial planning software 26 is preferably a software tool or program that currently exists within the system and can be used by the advisors 34 (e.g. via advisor device 35 as shown in FIG. 1). The platform 12 is configured to leverage and integrate the data and information that can be generated by the financial planning software 26 to provide more complete and precise outputs for users of the platform 12. For instance, the financial planning software 26 can be executed and used in performing analyses and optimizations (e.g., as shown in FIGS. 8 and 9 described below). This enables, for example, machine learning algorithms employed by the optimizer 27 to generate new plan inputs and in real-time feeds this data to the financial planning software 26 to generate a forecast of future outcomes. Then, in an automated fashion, the platform 12 coordinates having these future outcomes passed to a scoring algorithm to obtain a score. The platform 12 therefore provides an automated and real-time coordination and integration of data sources accessible to the platform 12 and/or input to the system 10 by a user (e.g., when interacting with a user interface as discussed below) to perform a more comprehensive computation and generate recommendations that exceeds what can be done by an advisor 34 alone. It can be appreciated that the financial planning software 26 can operate independently, e.g., for other uses, while being integrated and leverages by the platform 12 as shown in FIG. 1. For example, the financial planning software 26 is integrated with other component such as the optimizer 27 to conduct a forecasting process in an automated and real time fashion.

Figure 2:
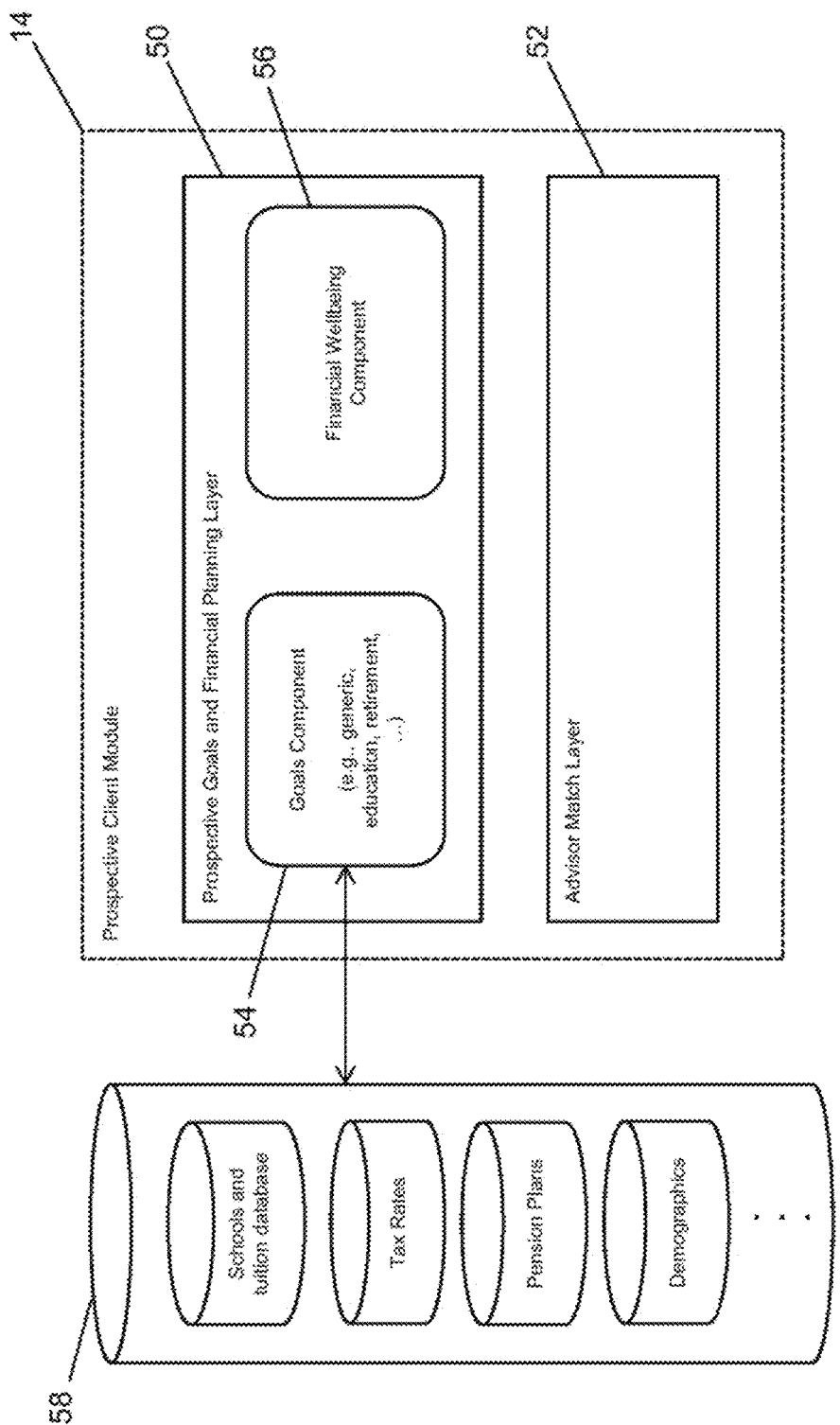
FIG. 2 is a block diagram of an example of a configuration for the prospective client module of FIG. 1.

FIG. 2 illustrates a block diagram of the prospective client module 14. The prospective client module 14 comprises a prospective goals and financial planning layer 50, and an advisor match layer 52. The prospective goals layer 50 is configured to implement computer executable code to identify the financial goals, financial plan, and financial situation of the prospective client 30, and calculate the probability that the prospective client 30 meets the financial goals by leveraging the tools and access to data provided by the platform 12. The prospective goals layer 50 may also be configured to determine how the financial plan can be modified to allow the prospective client to improve their probability to achieve the financial goals. In this example, the prospective goals layer 50 comprises a goals component 54 and a financial wellbeing component 56. The goals component 54 can capture information about common goals and concerns that the prospective client 30 considers most important. For example, the goals component 54 may provide a list of goals held by a large number of other individuals and allow the prospective client 30 to select goals that they also wish to achieve. This can include a predictive function to suggest and prioritize a specific goal 322 (see below) based on context and prospect information.

The goals component 54 can also be configured to address one or more goals, such as education, retirement, estate planning, tax planning, etc. For example, an educational module of the goals component 54 can capture information about the savings required by the prospective client 30 to fund the education of one or more dependents. For example, the education module of the goals component 54 may calculate the total cost of education, a timeline of when educational costs will be paid, the amount of money previously saved by the prospective client 30, the amount of money still required to fully fund the education, and a savings plan the prospective client 30 may use to fully fund the education. In this example, the educational module goals component 54 is in communication with a schools and tuition dataset within the database 58, which dataset contains information on the costs of attending various educational institutions. The schools and tuition dataset may allow the prospective client 30 to personalize their educational goal by selecting different schools their dependents may attend. As shown by way of example in FIG. 2, other datasets can be stored that can be used for other goals, such as retirement. For instance, datasets containing tax rates, pension plans, inflation, demographics, spending, interest rates, etc. can be stored in the database 58 and be accessible to the various goals modules in the goals component 108.

In another example, a prospective retirement planning module in the goals component 54 of the prospective goals and financial planning layer 50 can be configured to collect information about the retirement plans of the prospective client 30, a financial plan used by the prospective client 30 to prepare for retirement, and the probability that the financial plan will be successful. The retirement planning module can calculate the amount of money needed by retirement, the amount saved by the prospective client 30 for retirement and the amount of money the prospective client 30 will have saved by the time of retirement. The retirement planning module can also calculate the financial wellbeing of the prospective client 30, which may be presented as a financial wellbeing score using a separate financial wellbeing component 56. The financial wellbeing component 56 is configured to monitor the financial wellbeing of the prospective client 30, for example by collecting information about the prospective client's investment philosophy, income, financial situation, and liabilities, which can be presented as a financial wellbeing score.

The advisor match layer 52 is configured to match the prospective client 30 with a suitable advisor 34. The information collected by the prospective goals and financial planning layer 50 may be used to identify the advisor 34 that can meet the unique needs of the prospective client 30 and sent to the advisor 34 for consideration. The information collected by the prospective goals and financial planning layer 50 may also be copied and saved to the book of record 24. In this way, the platform 12 not only provides access and integration amongst the data sources available, but also enables integration between the client side and the advisor side of the system 10 to provide an ability to obtain real time access to advisor expertise without the need to physically visit an advisor. Moreover, the platform 12 provides an ability to match clients with advisors anywhere, so long as there is access to the platform 12.

Figure 3:
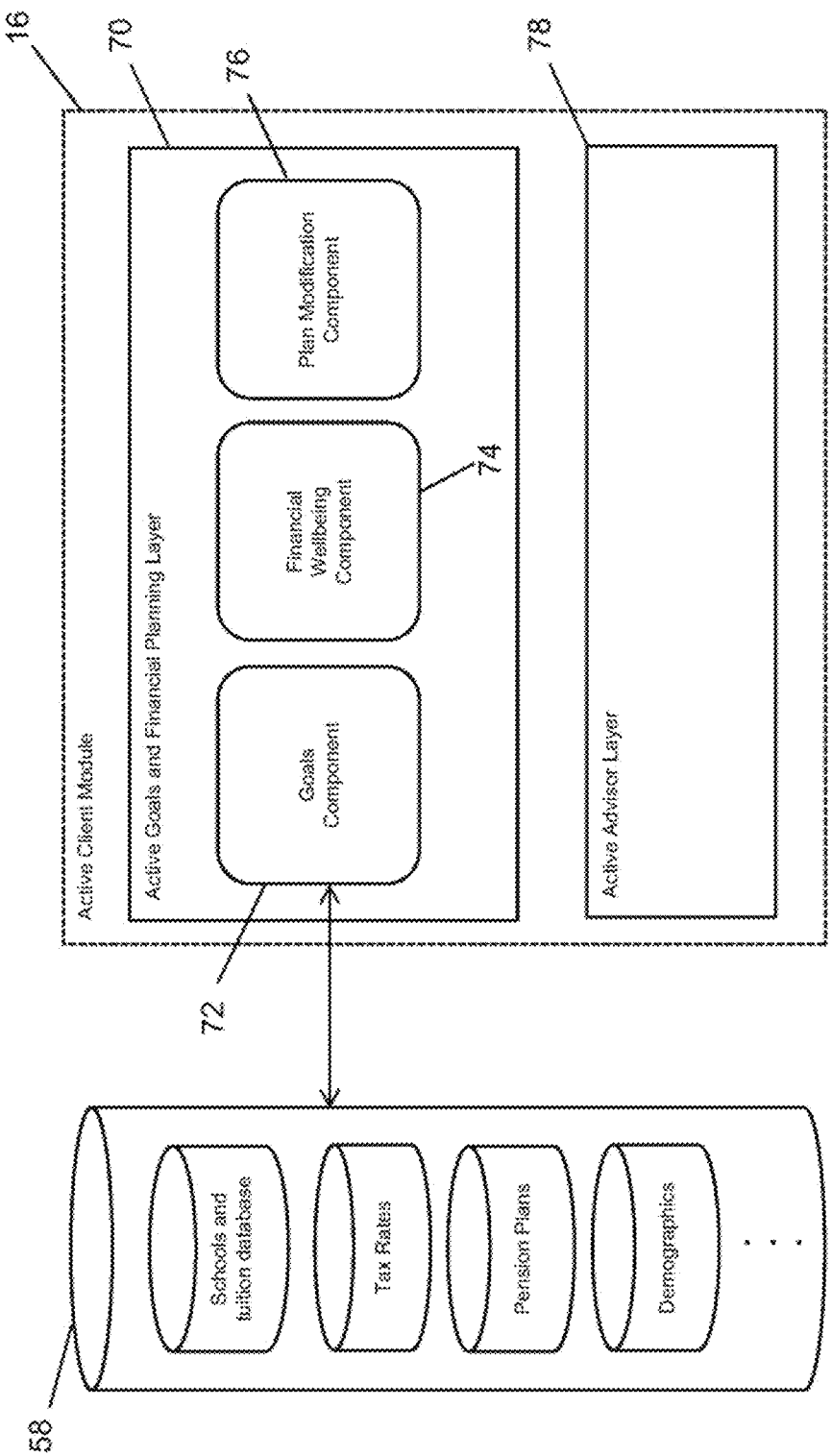
FIG. 3 is a block diagram of an example of a configuration of the active client module of FIG. 1.

FIG. 3 illustrates a block diagram of the active client module 16, which in this example comprises an active goals and financial planning layer 70 and an active advisor layer 78. The active goals and financial planning layer 70 is configured to monitor a financial plan, track the progress of the active client 32 towards financial goals, calculate a financial wellbeing score, and calculate the effect of any modifications to the financial plan on achieving financial goals and the financial wellbeing score. In this example, the active goals and financial planning layer 70 comprises a goals component 72, a financial wellbeing component 74, and a plan modification component 76.

The goals component 72 is configured to track the progress of the active client 32 towards meeting their saving goals. The goals component 72 may be in communication with the integration layer 22 to retrieve information on the active client 32, such as their income and saving goals, from the book of record 24. The goals component 72 can calculate the probability that the active client 32 meets the saving goals and may also be configured to calculate how the active client 32 can change the saving plan in order to meet the saving goals. The goals component 72 can also access the database 58, e.g., to access tax rates, pension plans, school data, etc.

The financial wellbeing component 74 is configured to monitor the financial wellbeing of the active client 32, for example by collecting information about the active client's 32 investment philosophy, income, financial situation, and liabilities, which can be presented as a financial wellbeing score.

The plan modification component 76 is configured to allow the active client 32 to change the components of the financial plan, and observe, in real-time, the anticipated effects of the change on their ability to meet their financial goals. For example, the plan modification component 76 can determine if retiring earlier will result in the active client 32 failing to achieve one or more of the financial goals.

The active advisor layer 78 is configured to send and receive data from the advisor module 18, for example information on a requested change to the retirement plan. The active advisor layer 78 is also configured to schedule appointments or enable communication between the active client 32 and the advisor 34.

Figure 4:
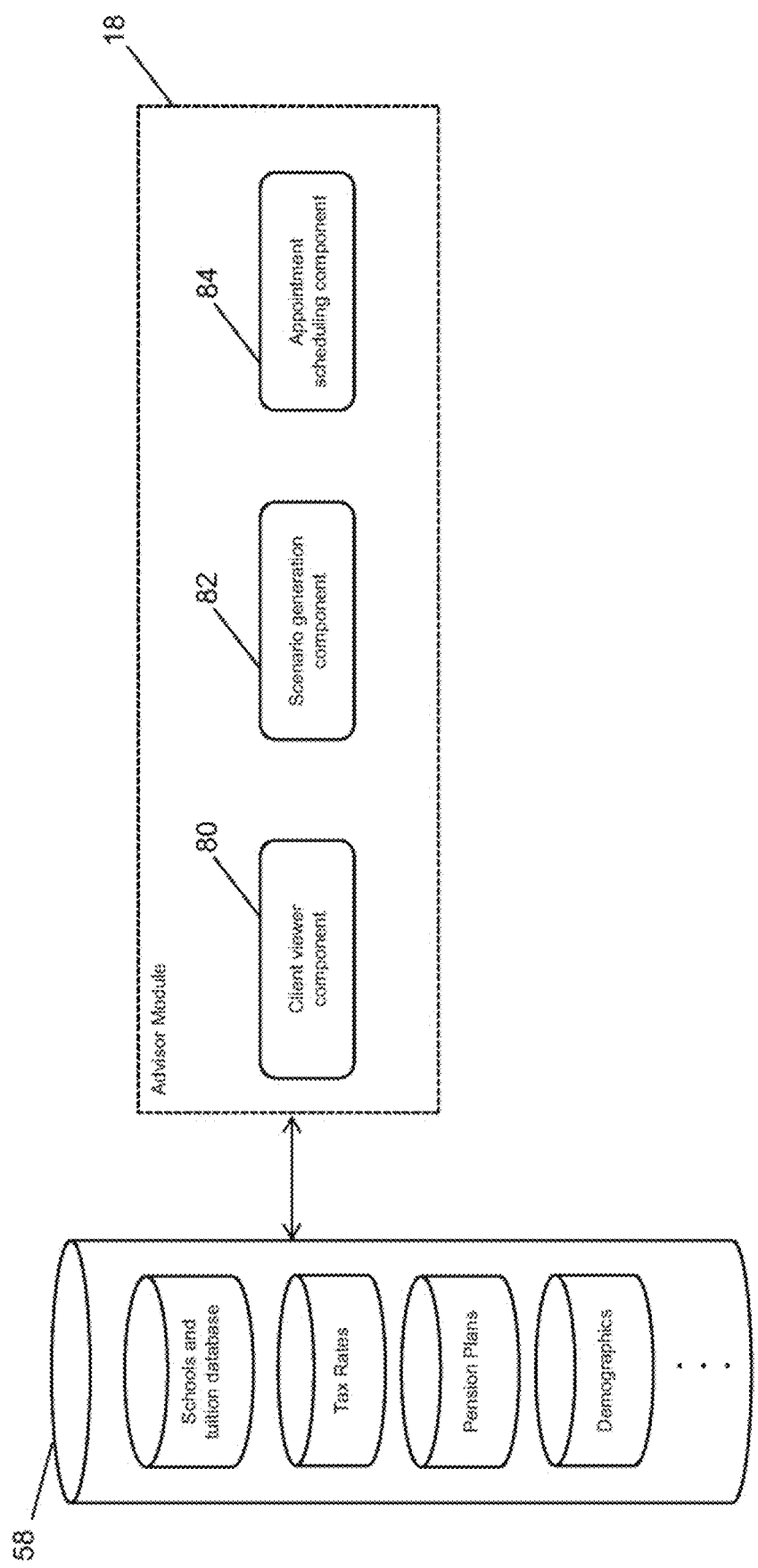
FIG. 4 is a block diagram of an example of a configuration of the advisor module of FIG. 1.

FIG. 4 illustrates a block diagram of the advisor module 18, which in this example, comprises a client viewer component 80, a scenario generation component 82, and an appointment scheduling component 84. The client viewer component 80 is configured to communicate with the integration layer 22 to retrieve information from the book of record 24 related to the prospective client 30 and/or the active client 32, for example their saving plan or income. The scenario generation component 82 is configured to allow the advisor 24 to propose modifications to the savings plan or retirement plan, for example to allow the active client 32 to save enough money to meet a new savings goal. This can also include real-time effects of modifications and optimizations of the savings plan or retirement plan. The appointment scheduling component 84 is configured to schedule appointments or enable communication between the advisor 34 and the active client 32 and/or the prospective client 30. The advisor module 18 can also have access to the database 58.

Figure 5:
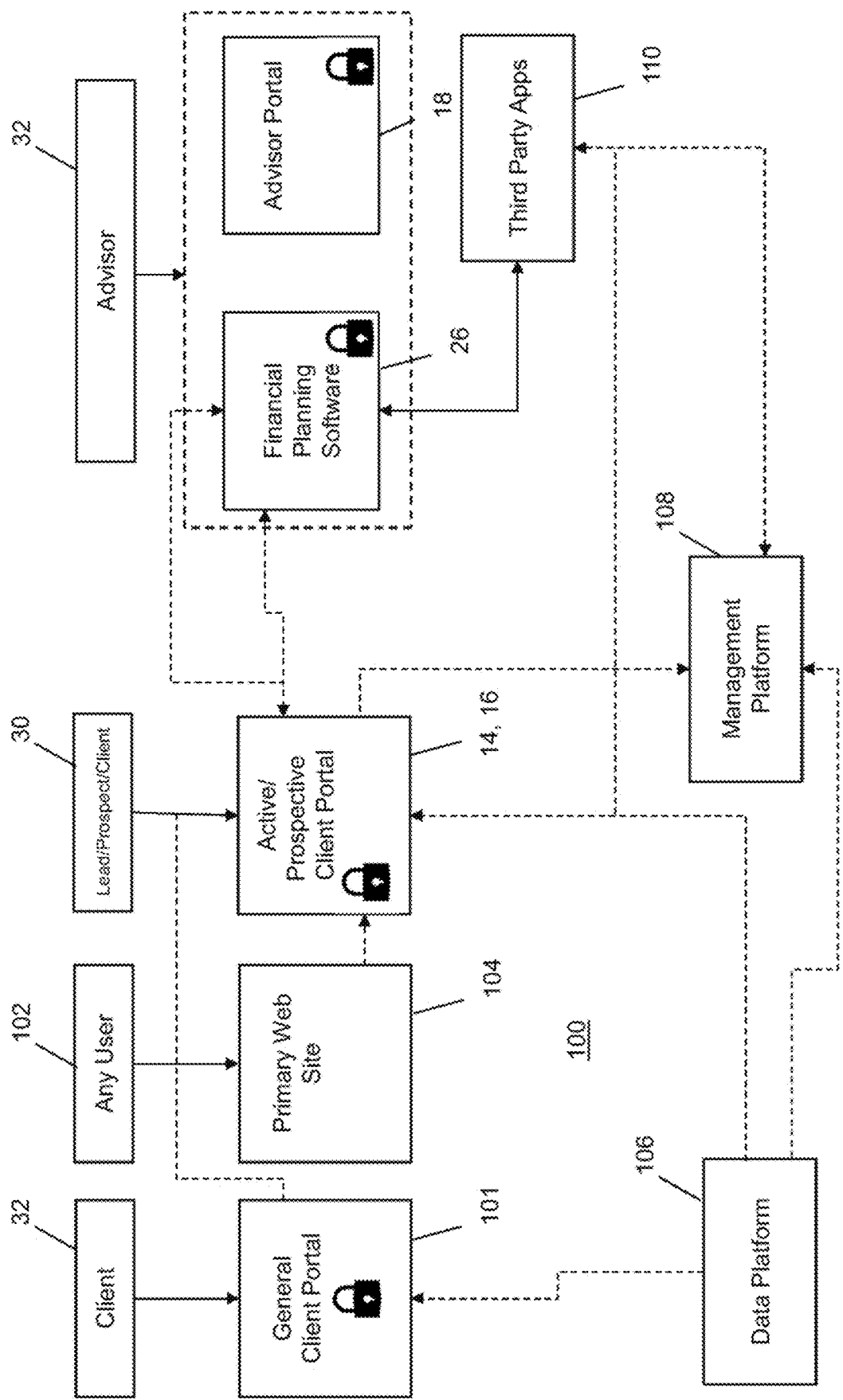
FIG. 5 is a block diagram of an implementation for the platform shown in FIG. 1.

Turning now to FIG. 5, an example of a configuration for the system 100 is shown. In FIG. 5, solid lines correspond to presentation or user interface functionality, whereas dashed connector lines represent the electronic exchange of data between components. The active client 32 can access a general client portal 101 (e.g., having a profile, investment performance information, statements, etc.) via an authenticated connection via a user interface such as a web browser or app. A lead, such as a prospective client 30 can also access the prospective client portal 14 (considered part of prospective client module 14) via an authenticated connection. Similarly, the active client 32 can also access the active client module 16 (considered part of the active client module 16). A primary web site 104 (e.g. for a financial institution) that is separate from the platform 12 can be provided to enable other users 102 to access the system 100. The general client portal 101 receives investment performance, client profiles, etc., from a data platform 106. The data platform 106 is an interface to systems of record (i.e. the integration layer 22 that can include book of record data and previously calculated financial wellbeing results), calculations for a financial wellbeing, recommended actions, etc. The data platform 106 also provides next best actions, recommendations, financial wellbeing, etc. to the portals 14, 16 and to third party apps 110. The data platform 106 also provides next best actions, recommendations, and financial wellbeing scores, etc. to a management platform 108 (e.g., Salesforce). The management platform 108 may also receive prospects from the portal 14.

The advisor 32 interfaces with the system 100 via either or both the financial planning software 26 and the advisor portal 18. The financial planning software 26 communicates with the portals 14, 16 for exchanging financial information and plans, alerts, etc. It can be appreciated that a single sign on (SSO) functionality can be employed to enable advisors to login in to both the financial planning software 26 and the portal(s) 14, 16, e.g., via an employer's system.

Figure 6:
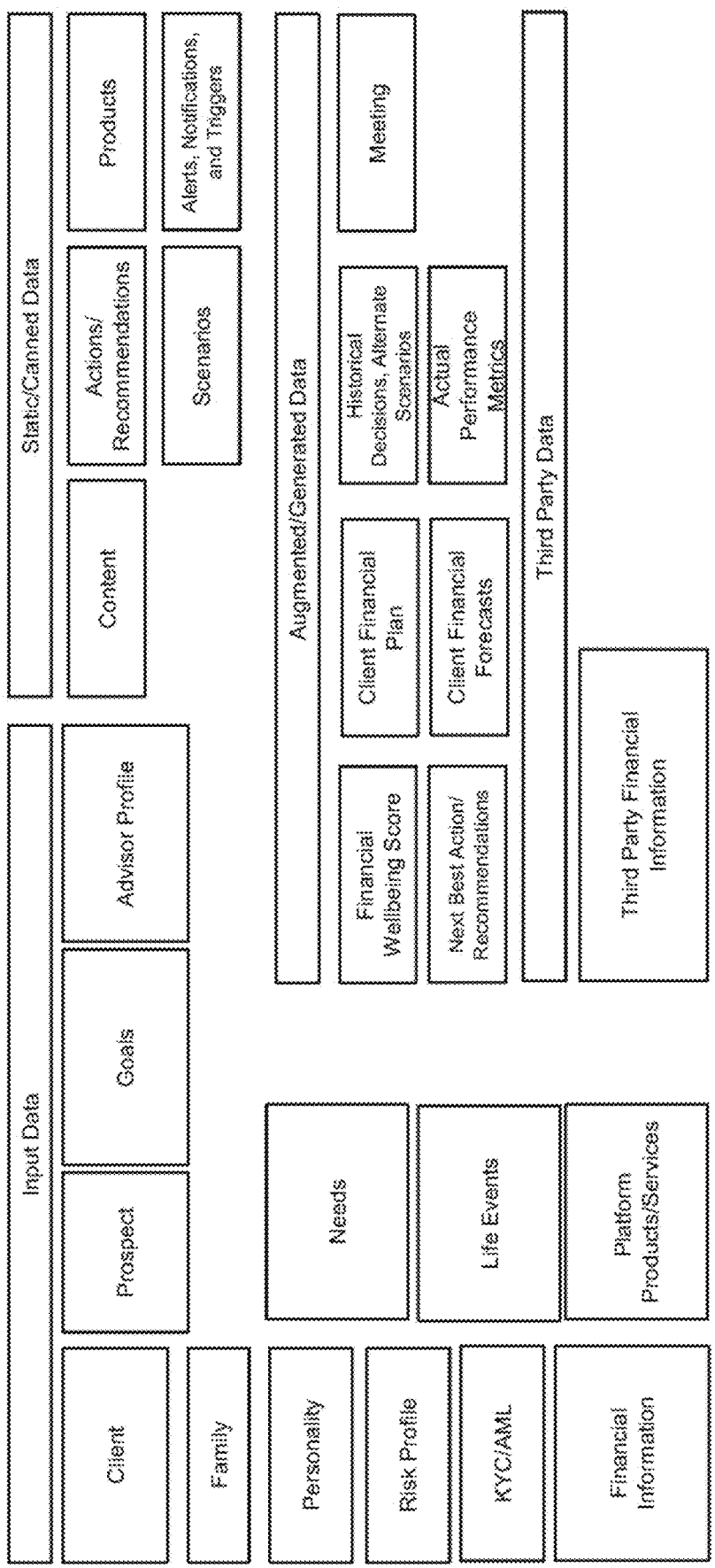
FIG. 6 is an example of a data model for generating a financial wellbeing score.

FIG. 6 illustrates graphically a data model showing the various sources of data that can be integrated by the platform 12 to generate improved financial plans and financial wellbeing scores and recommendations. The data model shown in FIG. 6 includes input data, static or "canned" data, augmented or generated data, and third party data.

The input data can include, for example, client data (e.g. contact information, preferences, employment and tax information, etc.), prospect data (e.g., web login credentials), goals (e.g., aspirational financial outcomes), advisor profile data (e.g., employee ID, location/office, subject matter expertise, contact information, preferences, personality data, performance ratings, etc.), family data (e.g., client family relationships), personality data (e.g., investment philosophy, mindset segmentation), risk profile (e.g., investment risk tolerance, investment experience, etc.), KYC/AML data (e.g., proof of identity, transaction monitoring), financial information (e.g., assets, liabilities, income, expenses, investments, insurance, list of financial service providers, etc.), needs data (e.g., retirement planning, tax planning, estate planning, death/disability planning, business succession, cash flow, etc.), life events (e.g. birth, death, retirement, major purchase, changing jobs, marriage, divorce, starting a business, etc.), and platform products/services (e.g., current products/services offerings, discount promotions, etc.).

The static or canned data can include, for example, content (e.g., componentized content), actions or recommendations, products, scenarios, (e.g., pre-canned planning scenarios), alerts or notifications and triggers, etc.

The augmented or generated data can include, for example, financial wellbeing scores, client financial plans, historical decisions, alternative scenarios, meeting(s), next best actions or recommendations, client financial forecasts, and actual performance metrics.

The third party data can include third party information such as transaction-level data managed by external financial services firms (e.g., banks), market data, etc.

Figure 7A:
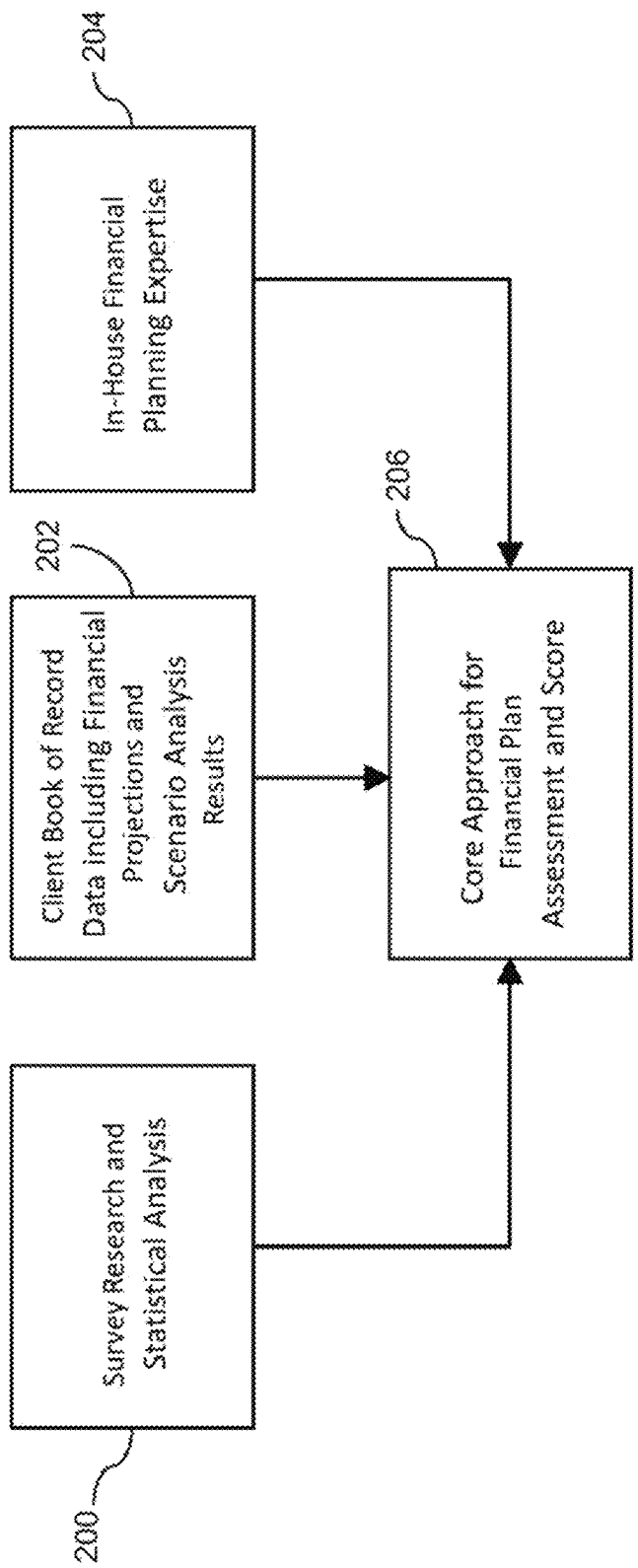
FIGS. 7(a) and 7(b) are flow charts illustrating a core assessment and scoring process.

Turning now to FIG. 7(a), a core process for generating a financial plan assessment and financial wellbeing score is shown. In this core process, survey research and statistical analysis data 200, client book of record data 202, and in-house financial planning expertise 204 are obtained. The client book of record data 202 may include financial projections and scenario analysis results. These three sources of data are accessed and integrated to generate a financial plan assessment and score 206. This core approach to generating the score 206 can be implemented using the financial planning software 26 (and if applicable the forecast module 27) to generate forecasts and scenario analysis results.

Figure 7B:
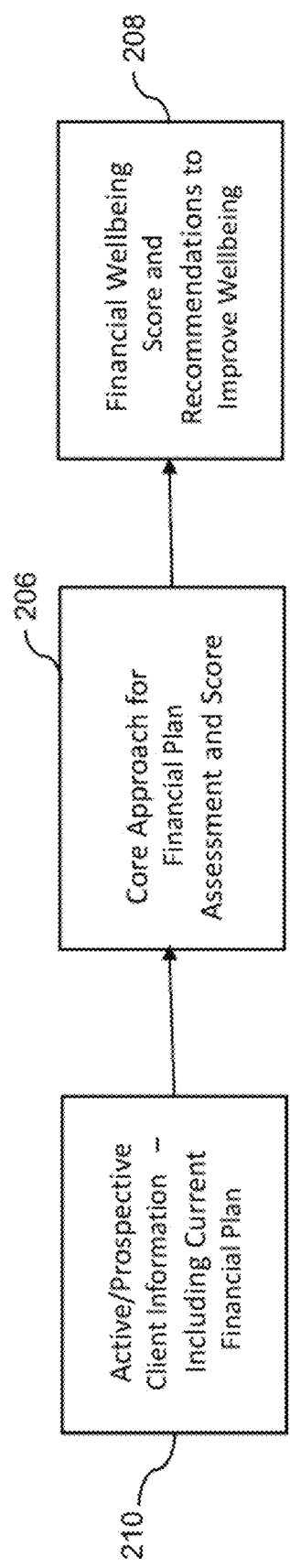

As shown in FIG. 7(b), client information 210 for an active or prospective client generated by the financial planning software 26 and including a current financial plan, is used as an input to the core approach for financial plan assessment and score 206 to evaluate the client information 210 against the data used in the core approach (shown in FIG. 7(a)) to generate a financial wellbeing score and recommendations 208. For example, a prospective client 30 can enter data into the prospective client module 14 via the device 31 and the prospective client module 14 passes some information to the financial planning software 26 for forecasting. The forecasting results in addition to data entered by the prospective client 30 are then used in the calculation of the financial wellbeing score. In this way, the prospective client module 14 operates autonomously within the platform 12 to coordinate the parsing, redirecting, and provisioning of the other systems within the platform 12 to execute the operations described herein. In another example, the active client 32 would interact with the platform in a similar manner, but through the active client module 16 via the device 33. The client data used in this example would originate from the book of record 24 since the system 10 is already familiar with this client 32. As such, it can be appreciated that the system 10 includes both prospective and active client functionality and automatically handles and accesses appropriate data accordingly.

FIG. 8 provides an example of a process for using the optimizer 27 to generate an advanced financial wellbeing score 232. In this example, the client information 210 for the active or prospective client 30, 32 that would have been generated using the financial planning software 26 is input to the optimizer 27. The optimizer 27 uses the current plan to generate forecast information 222, e.g., by utilizing the forecast module 29 or the financial planning software 26 (with forecasting capabilities). For example, this can include looking at future cashflows by scenarios. The optimizer 27 uses these inputs to determine the value of the financial plan, e.g., based on in-house expertise. Based on the value of the financial plan 224, the optimizer 27 can determine how good the plan is, modify the plan 226, and perform an optimization step by repeating 222 to find a financial plan with a better value at 224. The optimizer 27 therefore can iterate to improve the overall financial plan score to generate an optimized financial plan 228 which can be compared to the current plan 210 to generate an advanced financial wellbeing score 232. It can be appreciated that the optimizer 27 can re-run the inputs through the financial planning software 26 to reforecast the plan each time the plan inputs are modified in an optimization step. The optimizer 27 can also avoid re-running the financial planning software 26 if the optimizer 27 can sufficiently approximate the results without having to call the software 26 again. In this way, the optimizer 27 can simply call the financial planning software 26 at the end of the process to get the most accurate result for the final optimized set of inputs. That is, the execution of the optimizer 27 can be optimized by selecting running the financial planning software 26 when appropriate and performing intermediate approximate evaluations to avoid slowing down the system 10 such that results can be generated in real-time or near real-time. For example, if a user makes edits to their plan and selects an option to "optimize my plan", the platform 12 can automatically coordinate a reassessment by determining whether to re-run the entire planning process or to make such approximate calculations to decrease the waiting time of the user.

FIG. 9 illustrates a peer-based score process. The active or prospective client information 210 is again used, along with book of record information on other existing clients (including their financial plans and financial wellbeing scores)—i.e. the client's "peers", in a machine learning algorithm 244 to identify the most similar other clients with optimal financial wellbeing scores. The book of record data for the existing clients 32 can be pulled from the financial planning software 26 (e.g. pulled from the book of record 24 when saved there by the financial planning software 26) to obtain the existing plans. The machine learning algorithm 244 is capable of analyzing across vast amounts of data to find one or more similar clients that can provide recommendations for the particular client being assessed. This generates peer-based financial plan recommendations 246 that can be compared at 248 to the current financial plan to then generate a peer-based financial wellbeing score 250. In this way, the client 30, 32 can determine how close they are to their peers in their financial planning, which can normalize scenarios, e.g., based on age or other demographics.

Figure 10:
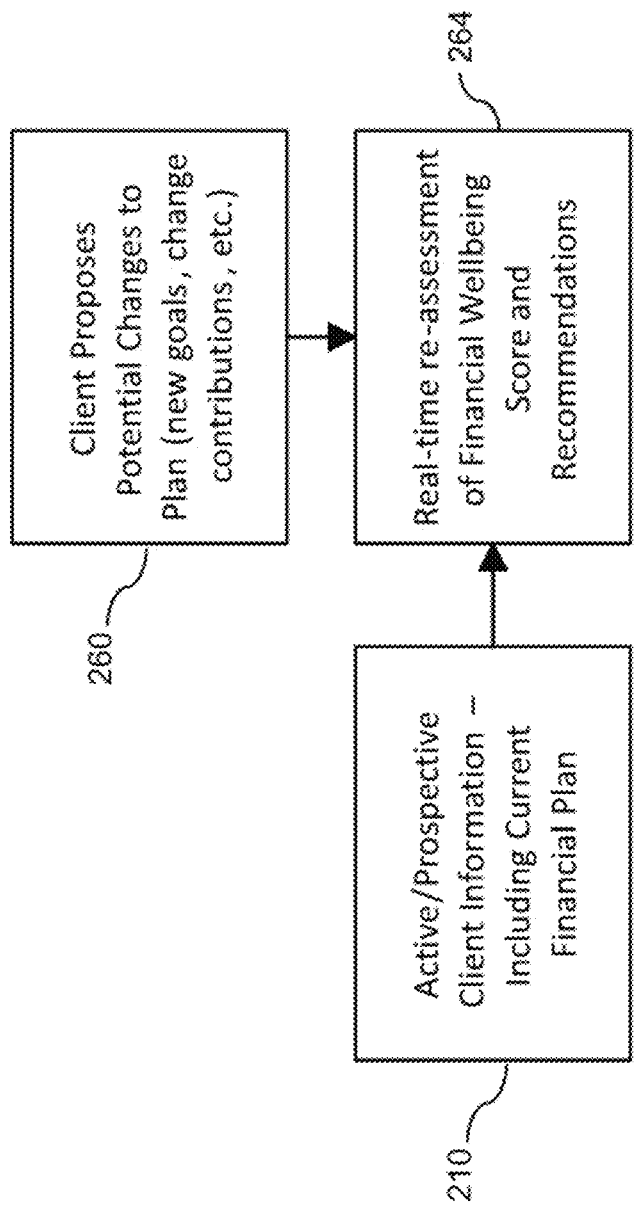
FIG. 10 is a flow chart illustrating a reassessment process.

FIG. 10 illustrates a scenario modelling process. In this process, the active or prospective client information 210 is used, along with proposed changes 260 made by the client, which can be pulled from the financial planning software 26. The platform 12 then performs a real-time re-assessment of the financial wellbeing score and recommendations 264, e.g., to generate one of the scores shown in FIGS. 7-9. As indicated above, the re-assessment of the score and recommendations can be coordinated in real-time such that the platform 12 further leverages and integrates the data sources in order to compute the scores and account for current inputs and current data.

Figure 11:
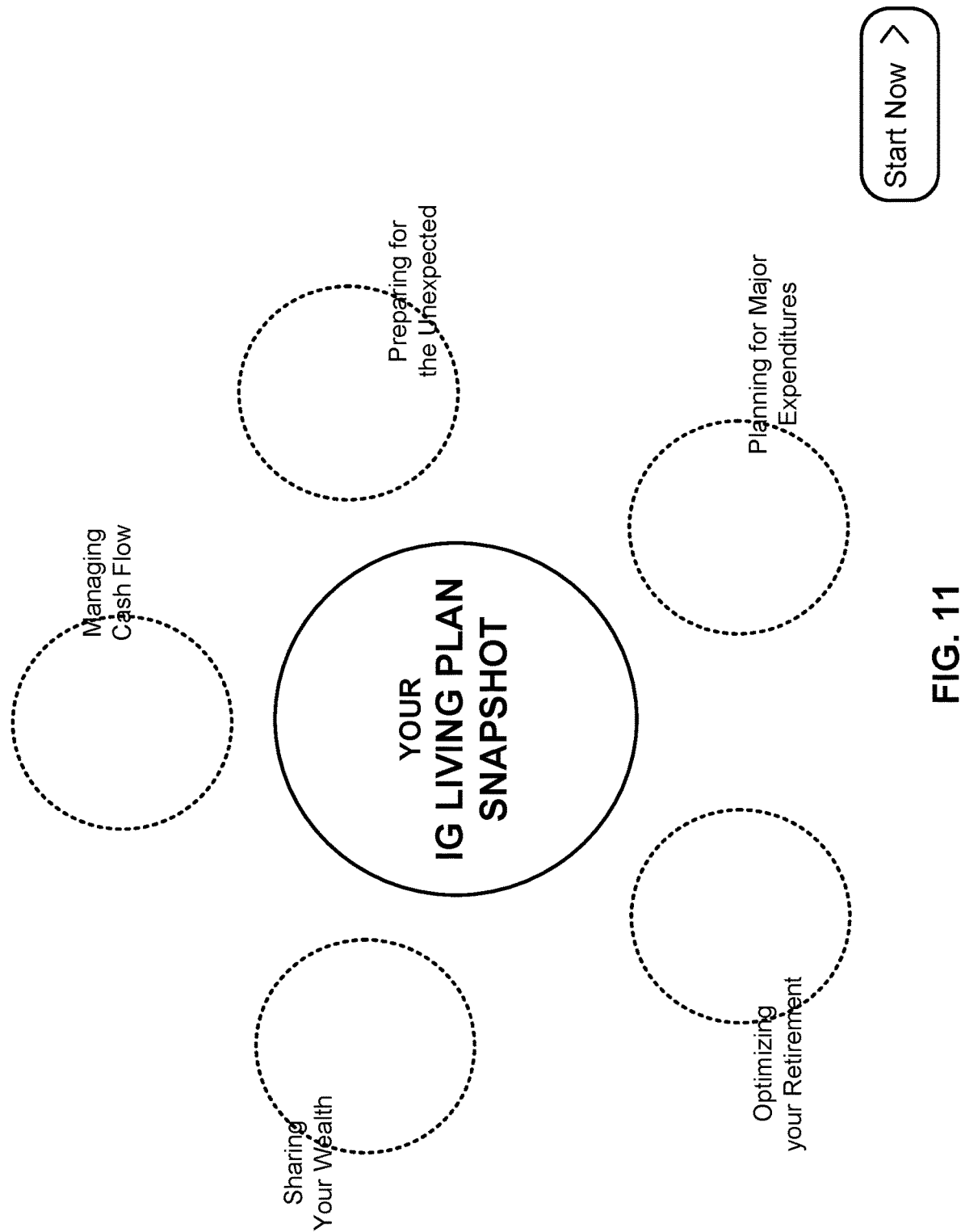
FIG. 11 is a schematic diagram of financial wellbeing considerations applicable to both prospective and active clients.

FIG. 11 provides a graphical illustration of five example areas of a financial life that can be considered in determining a financial wellbeing, by the financial wellbeing component 56. The example shown in FIG. 11 is applicable to both prospective and active clients 30, 32. By considering these areas together, decisions made in one area that opens opportunities or presents challenges in another area can be accounted for, in order to interconnect and synchronize the client's financial needs to maximize potential and achieve the financial wellbeing goal. The five example areas shown in FIG. 11 include managing cash flow efficiently, securing retirement, preparing for the unexpected, planning for major expenditures, and sharing your wealth. Each is considered in turn below.

Managing cash flow efficiently—when considering tax efficient strategies, this area can include a cash flow analysis, credit and banking solutions, and tax efficiency. This may require information such as budget(s), managing debit/credit, impulse purchases, annual tax preparation, etc. The system 10 may also assess the cash and credit requirements and aid in optimizing the client's taxes to help that client thrive during major life events, while working towards their goals.

Optimizing your retirement—when considering tax efficient strategies, this area can include retirement planning, investment planning, income planning, and private wealth programs. This may require information such as age, marital status, income, assets, pension(s), savings frequency. In this way, the clients can gain greater clarity and let the system 10 help the client manage the risks of retirement, preserve capital, and create income to help support further lifestyles and goals.

Preparing for the unexpected—when considering tax efficient strategies, this area can include risk management, life and health, and disability. This may require information such as emergency fund size, life insurance amount(s), disability insurance amount, critical illness amount, long-term care insurance, and will/power of attorney. This also allows the system to create comprehensive strategies that provide, preserve, and protect loved ones and those the client cares for when the unexpected happens.

Planning for major expenditures—when considering tax efficient strategies, this area can include debt management, education planning, and credit and liquidity solutions. This may require information such as credit card debt and interest rate(s), line of credit interest rates, RESPs/RPSPs and other savings, tax free savings accounts, etc. In this way, the client can ensure that they have flexibility with a balanced plan that allows the client to take advantage of opportunities and helps make a financial vision a reality.

Sharing your wealth—when considering tax efficient strategies, this area can include estate and trust planning, intergenerational planning, and philanthropic planning. This may require information such as charitable giving/gifting plan, estate amount, and whole life insurance. This also enables the client to establish a well-constructed estate plan, tailored to their needs, that allows a client's legacy to endure by supporting the causes important to them.

It can be appreciated that although not shown in FIG. 11, the system 10 can also be used for other areas of one's financial life, particularly for active or established clients as the system 10 comes to know the client better. For example, another pillar that can be added is maximizing your business success. When considering tax efficient strategies, this area can include tax planning, business planning, and succession planning. This may require information such as whether the individual is a business owner, the years active, years profitable, and tax plan or tax professional involved. Business owners can therefore take full advantage and engage holistic strategies to synchronize and enhance their business and personal financial plan. Various other pillars may also be added and integrated into the system 10.

Figure 12A:
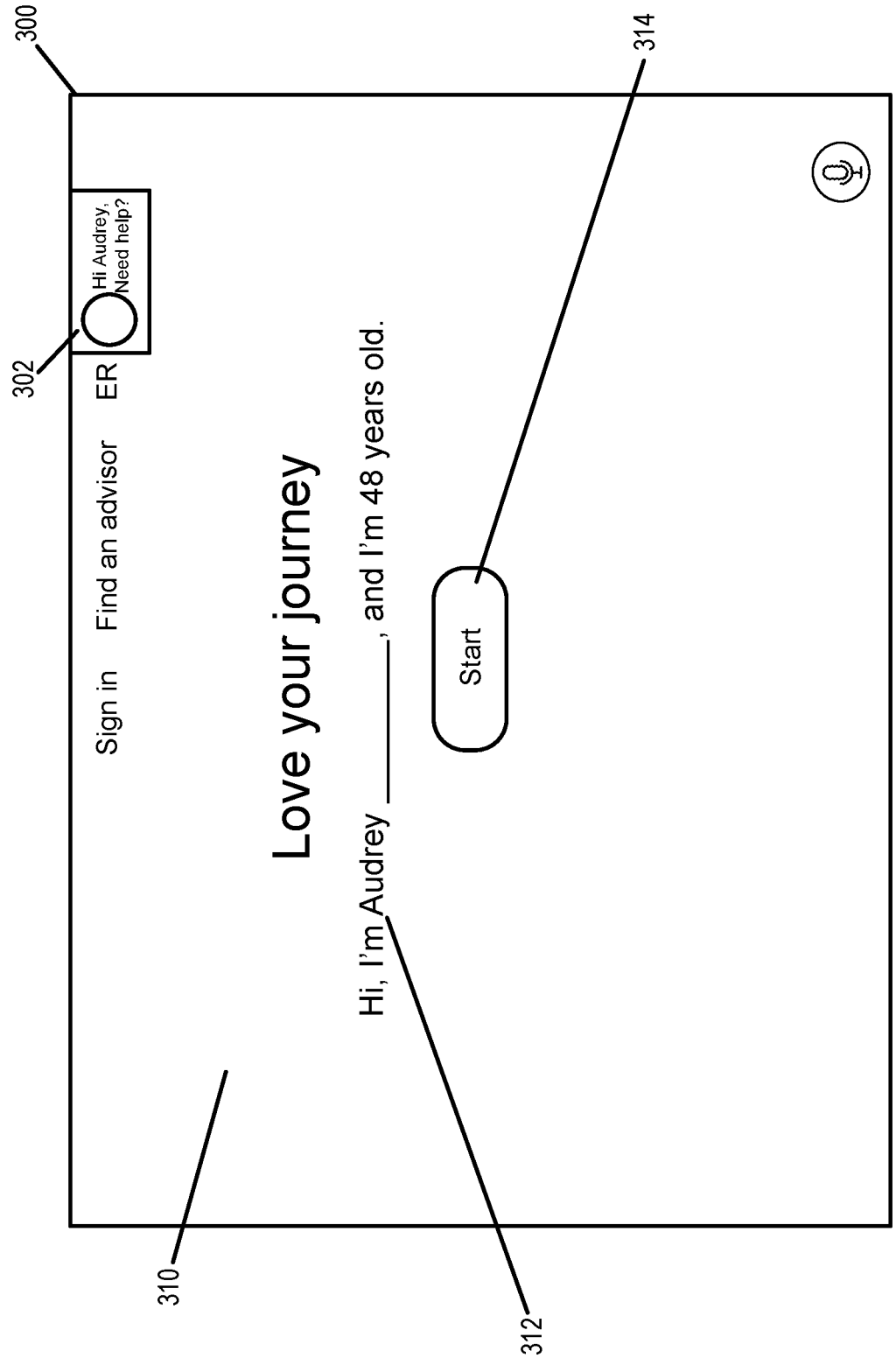
Figure 12B:
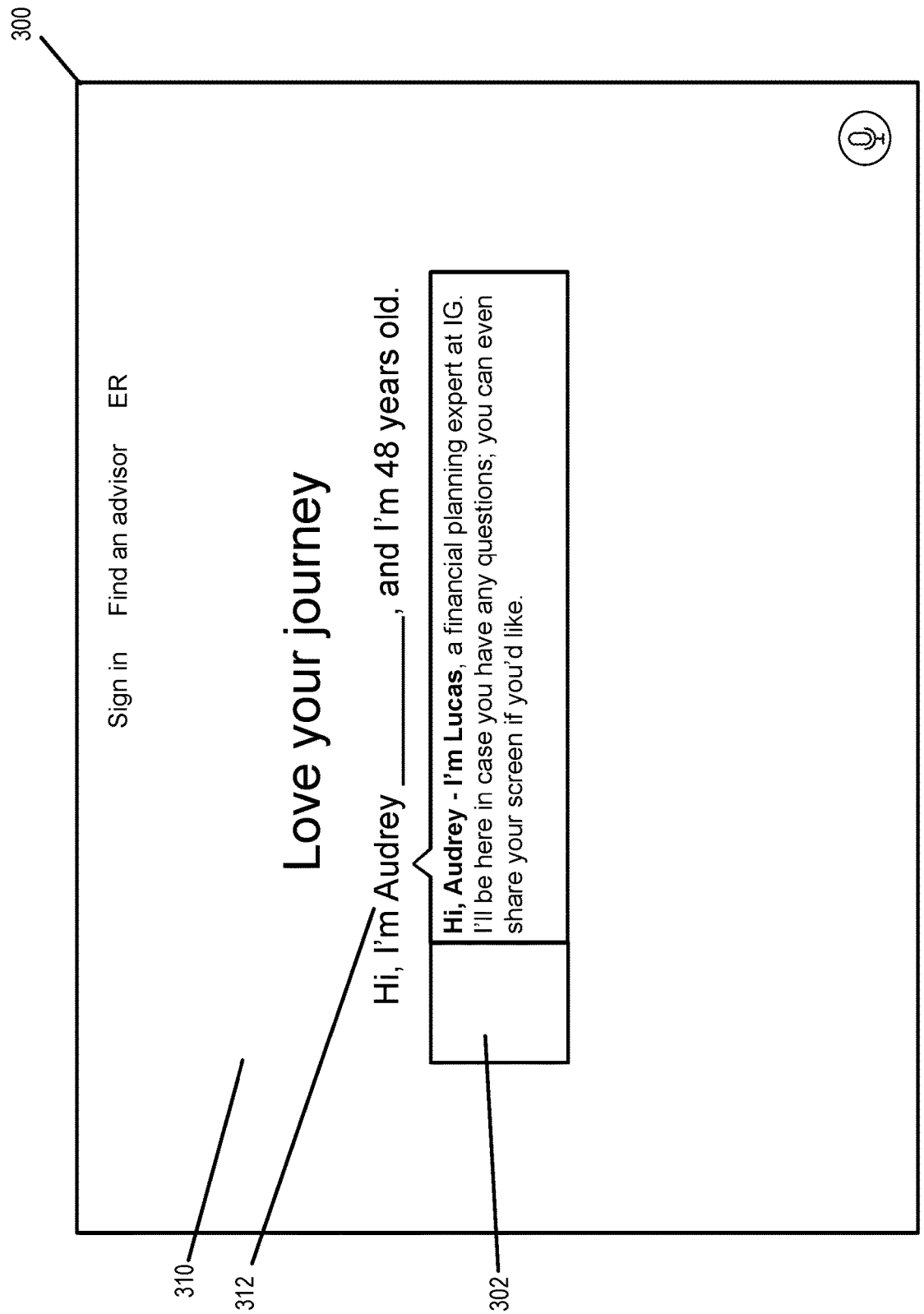

Turning now to FIGS. 12(a) through 26, screen shots of an example prospective client user interface (UI) 300 are illustrated. The prospective client UI 300 may be displayed on any device, for example the prospective client device 31. In FIG. 12(a), a welcome page 310 is shown, allowing the prospective client 30 to enter basic biographic information in text fields 312. A contact button 302 (or customer service rep, or chat-bot, etc.) is displayed on the prospective client UI 300, enabling the prospective client 30 to initiate a conversation with a contact at any time. The welcome page 310 includes a start button 314, enabling the prospective client 3 to begin identifying saving goals. As illustrated by FIG. 12(b), upon detecting the population of the text fields 312, the advisor button 302 can become enlarged to present a personalized message using the text from the text fields 312, for example a name.

Figure 13A:
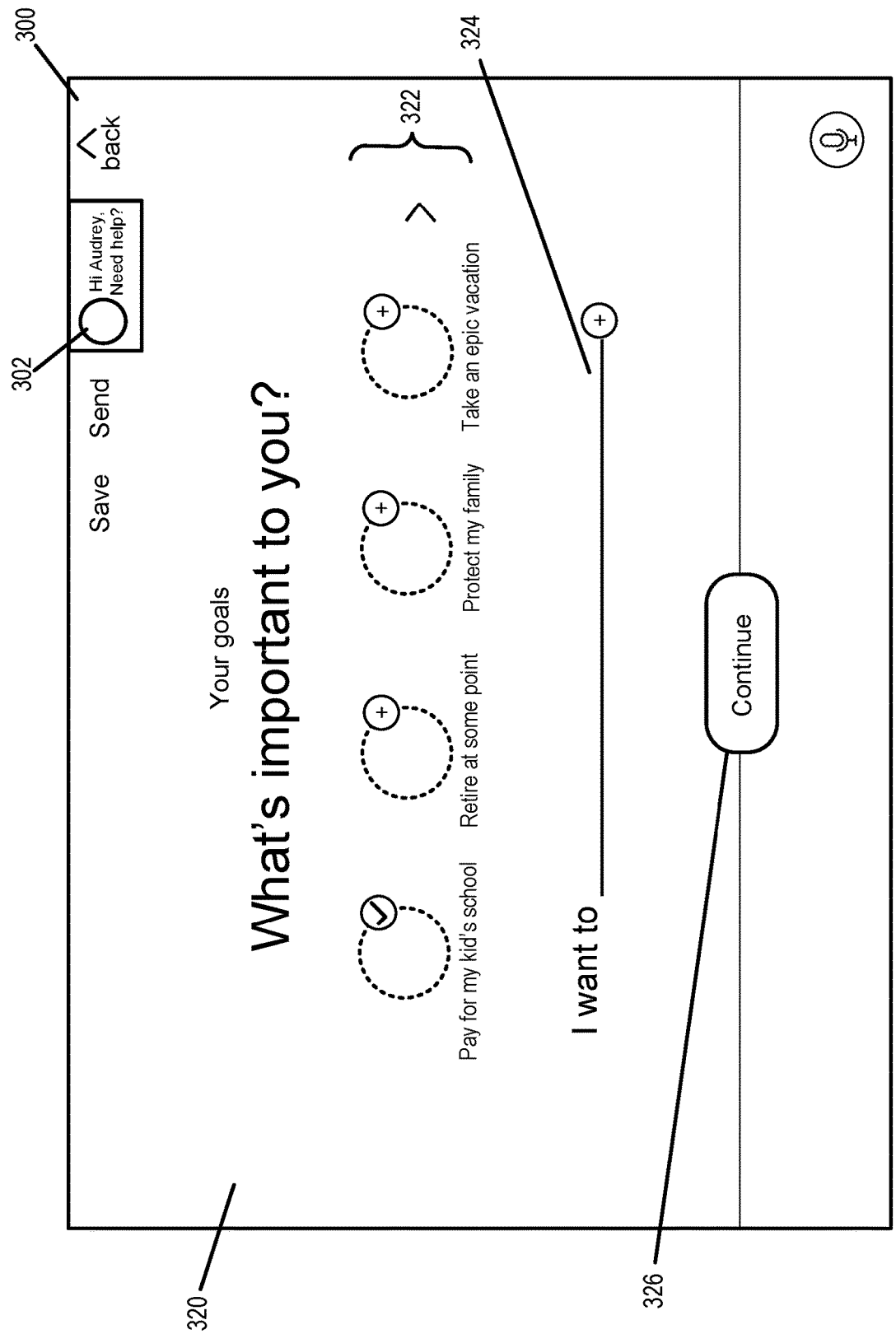
Figure 13B:
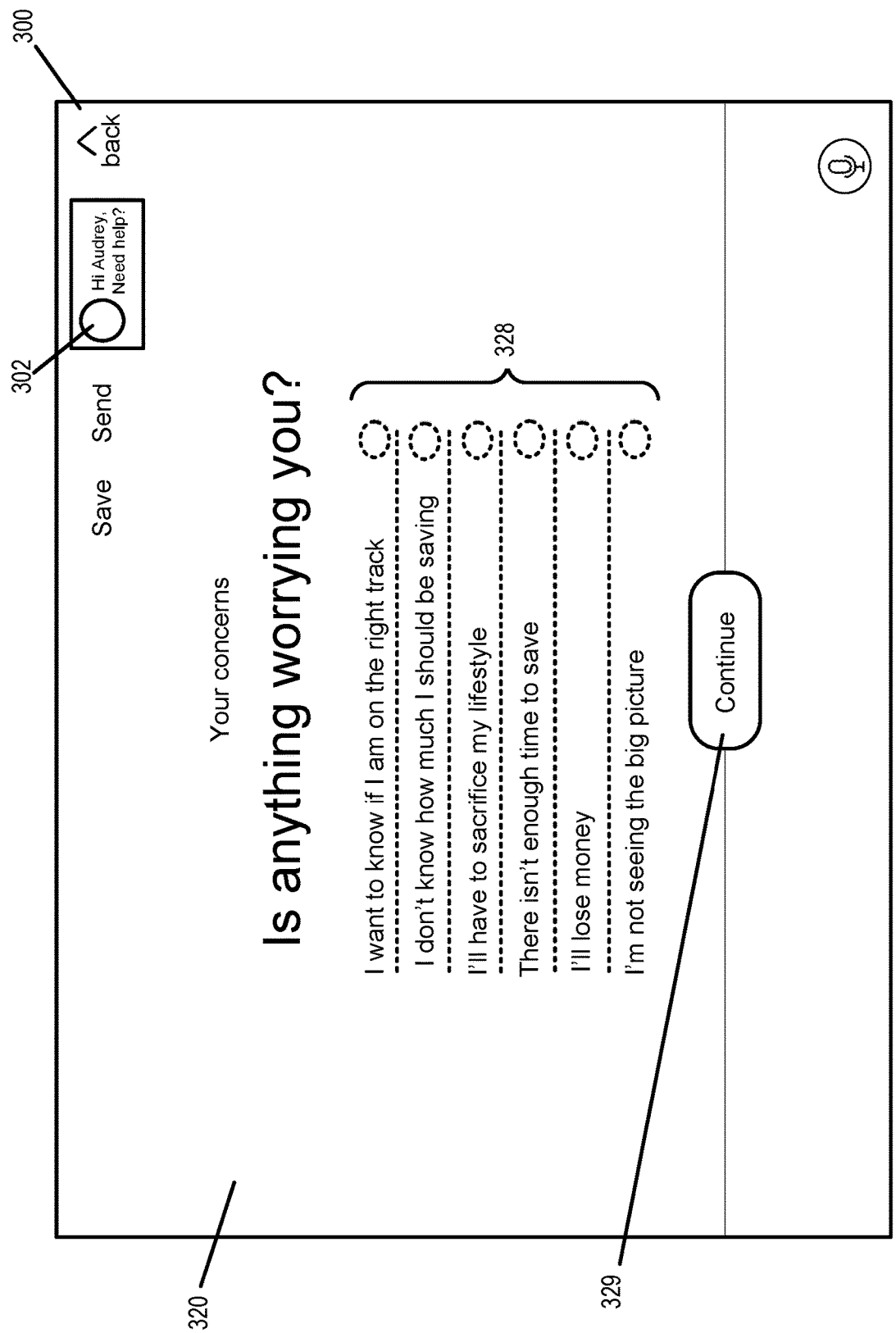

After detecting selection of the start button 314, the prospective client UI 300 can load a goals and concerns page 320 as shown in FIG. 13(a). The goals and concerns page 320 includes one or more generic goal buttons 322. The prospective client 30 can select generic goal buttons 322 corresponding to their saving goals. Personalized goals can also be entered in the entry field 324. By selecting the continue option, the goals and concerns page 320 displays a set of one or more generic concern buttons, as illustrated in FIG. 13(b). The prospective client 30 can select any generic concerns that apply, confirming their choice by selecting the continue option 329.

Figure 14E:
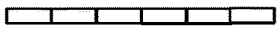
Figure 14F:
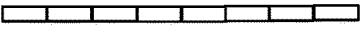
Figure 14G:
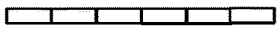
Figure 14H:
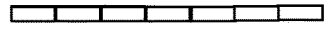

FIGS. 14(a) through 14(k) illustrate example screen shots of a graphical user interface (GUI) that can be used to guide a client 30, 32 (generally a "user") through an optimizing for retirement aspect of the financial wellbeing computation. Several GUI pages are used to step the user through various questions and selections in order to perform the forecast for that aspect. In FIG. 14(a), the user's age is requested, in FIG. 14(b) the system 10 asks if the user has retired, and in FIG. 14(c) determines when the user plans to retire in order to get the basic timeline for the forecast. In FIG. 14(d) the system 10 provides options to have the user select a range of total savings allocated to retirement and in FIG. 14(e) determines a range of what the user wants to save annually for retirement. At FIG. 14(f) some selection options are provided to determine sources of retirement income, in FIG. 14(g)

selection options are provided to determine the types of investments and savings the user has, and in FIG. 14(*h*) allows the user to self-describe their investment style, e.g., moderate, risk averse, aggressive, etc. As shown in FIG. 14(*i*) the system 10 may then ask how much the user plans to spend per month in retirement and in FIG. 14(*j*) determines the user's annual household income. Finally, as shown in FIG. 14(*k*), the system 10 may provide an option to have the user indicate if they have an advisor.

Figure 15:
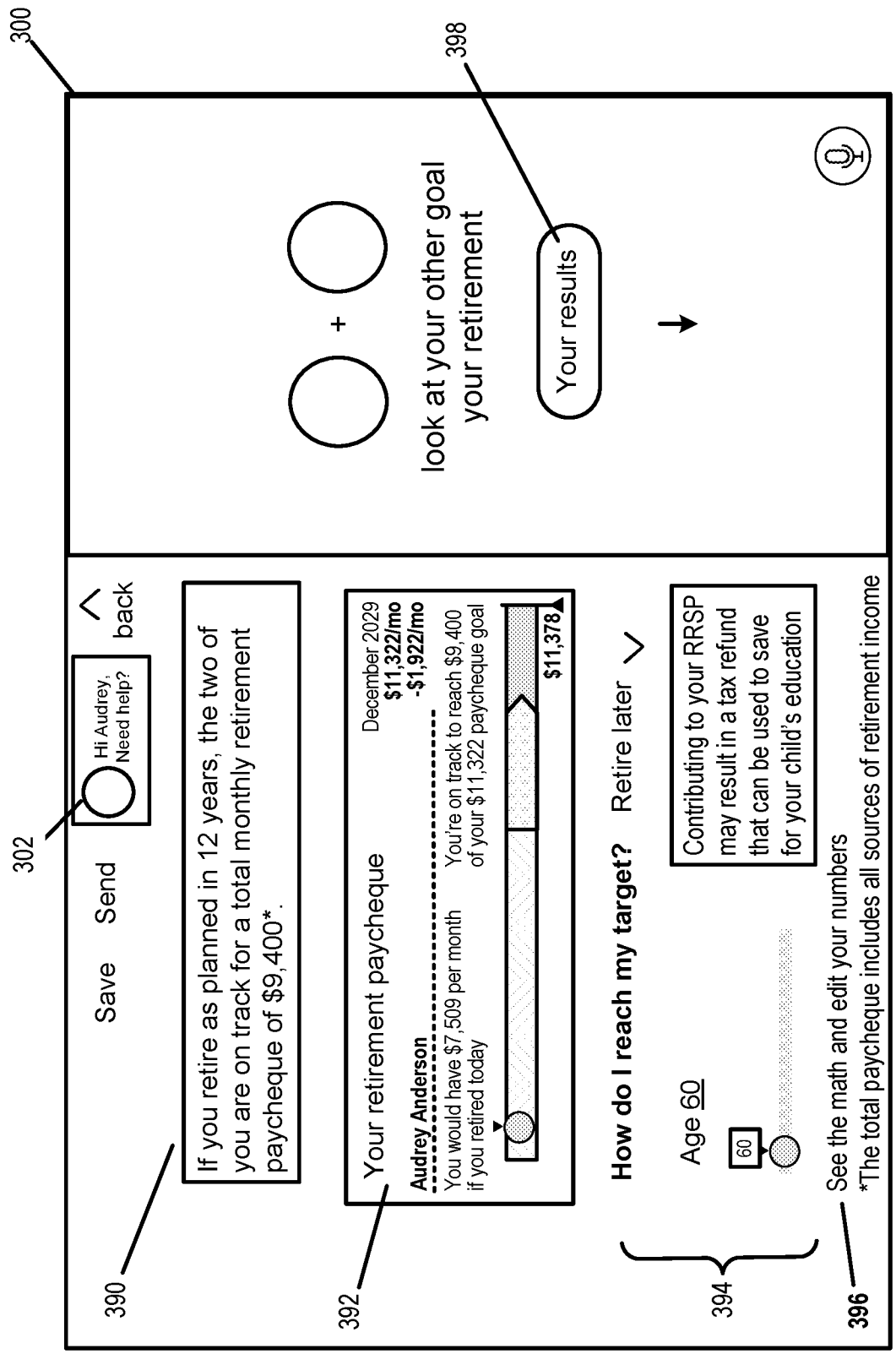

After detecting that the client is continuing with the process, a retirement summary page 390 is displayed, as shown in FIG. 15. A retirement status 392 is displayed, illustrating the progress made by the prospective client 30 towards achieving the retirement goal, and the results of their projected progress. In this example, the retirement status 392 shows the monthly retirement paycheck if the projected client were to retire immediately, the projected monthly retirement paycheck, and the difference between the projected monthly retirement paycheck and a target monthly retirement paycheck. The prospective client 30 can see the effects of modifications to the retirement plan by using entry options 394 to change their retirement age, monthly contributions to RRSPs, etc., and selecting an edit option 396. The prospective client 30 can also select a view results option to see an evaluation of their saving plan. The features shown in FIG. 15 provide additional context around the client's activities and what they need to do to achieve their goal. The entry options 394 includes an interactive slider tool that enables the client to dynamically modify their plans. The system 10 as described herein is integrated to enable the platform 12 to perform a real-time reassessment and can therefore conduct real-time scenario analysis by way of providing an interactive GUI as shown in FIG. 15. Moreover, the edit option 396 can be selected to enable the client to view the numbers behind the calculations to allow certain control to be provided, e.g., to override certain numbers. The platform 12 can then redo the forecast model and generate new outputs for the client to assess in real-time.

Figure 16:
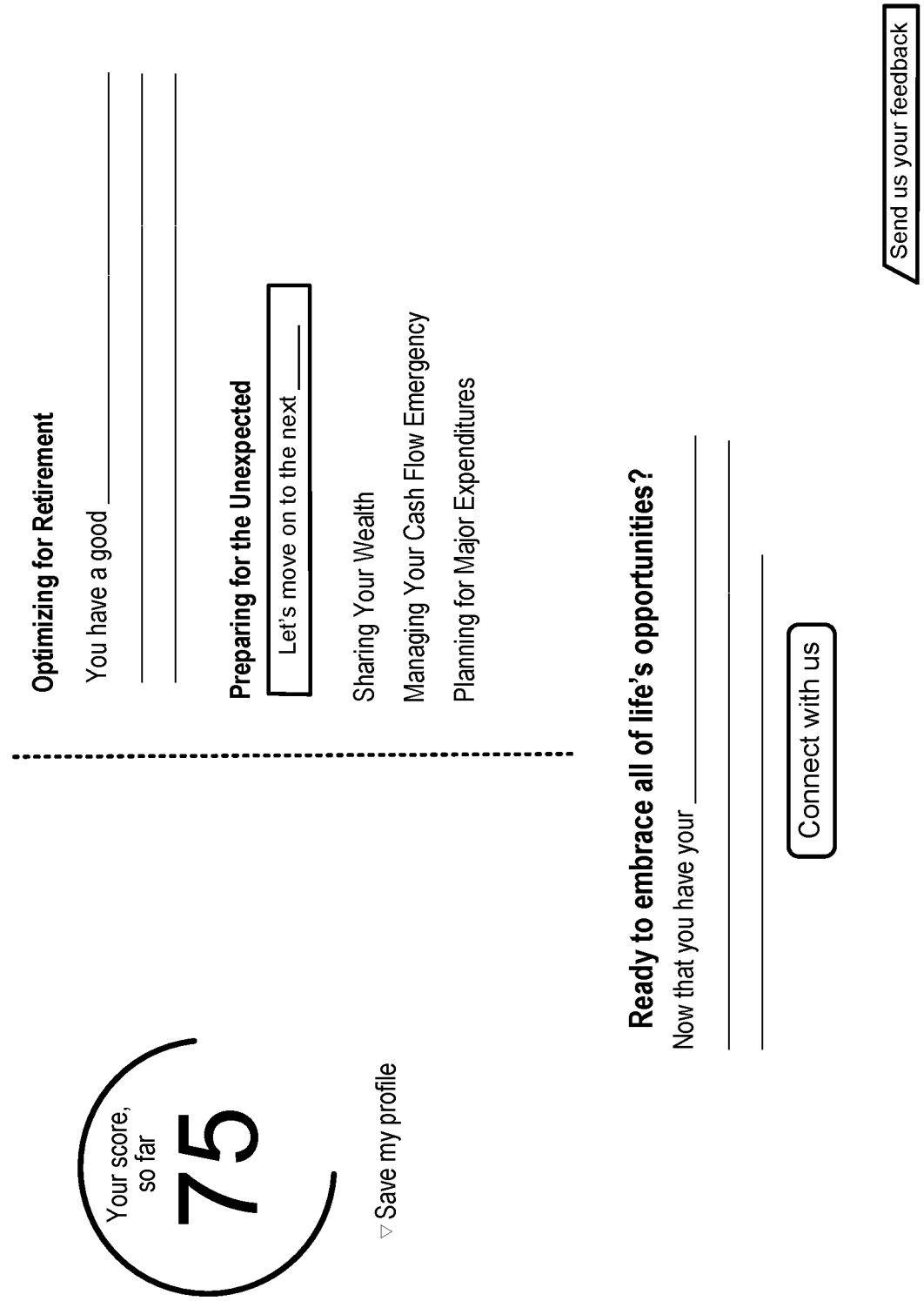

FIG. 16 illustrates a first intermediate scoring page which provides a score and an explanation associated with the retirement aspect that the user just completed. A "connect with us" option is provided to allow the user to proceed to connecting with an advisor via the platform 12 as described above. Next, the user is taken through the next aspect, namely preparing for the unexpected as shown in FIGS. 17(*a*) to 17(*g*).

In FIG. 17(*a*) the system 10 begins asking questions pertinent to this aspect of the score, in this case whether the user has term life insurance. In FIG. 17(*b*), the system 10 determines if the user has permanent life insurance, at FIG. 17(*c*) determines if the user has mortgage insurance, at FIG. 17(*d*) determines if the user has disability insurance, and at FIG. 17(*e*) determines if the user has critical illness insurance. In this way, the platform 12 guides the user through the appropriate questions and responses rather than simply asking the user to list the types of insurance they have, to improve accuracy and avoid missed data. At FIG. 17(*f*) selection options are provided for aspects of estate planning, e.g. will, power of attorney, etc. At FIG. 17(*g*) selectable options are provided to determine how the user might fund an unexpected expense, e.g., emergency funds, credit cards, etc. It can be appreciated that a page similar to that shown in FIG. 16 can be displayed to show an updated score and the progress of the workflow.

FIGS. 18(*a*) through 18(*h*) illustrate a set of GUI pages used by the system 10 to gather data points for the user with respect to the sharing your wealth aspect. FIGS. 18(*a*), 18(*b*), 18(*c*) and 18(*d*) enable the user to specify how they plan to share their wealth, which aspects of their estate are up to date, whether they have created a transfer plan, and which assets might be involved. FIG. 18(*e*) enables the user to select what they have done with respect to charitable giving, FIG. 18(*f*) determines if the user has a donation matching program at work, FIG. 18(*g*) determines if the user can take time off to volunteer, and FIG. 18(*h*) determines if the user feels they donate enough. A page similar to that shown in FIG. 16 can also be displayed at this point to provide an updated score and progress information. The user can also be given the option to connect with an advisor as shown in FIG. 16.

FIGS. 19(*a*) through 19(*k*) illustrate a set of GUI pages used by the system 10 to gather data points for the user with respect to the managing cash flow aspect. FIGS. 19(*a*) through 19(*d*) present the user with statements to be completed, such as "because of my money situation I feel like I never have the things I want in life", "I am just getting by financially", "I am concerned that the money I have or will save won't last", and "I have money left over at the end of the month". FIGS. 19(*e*) through 19(*g*) provide additional examples that enable the system 10 to determine the user's financial concerns and objectives with respect to their cash flow. FIGS. 19(*h*) through 19(*k*) illustrate mortgage-related questions that are to be answered or selected by the user.

FIGS. 20(*a*) through 20(*h*) illustrate a set of GUI pages used by the system 10 to gather data points for the user with respect to the planning for major expenditures aspect. In FIG. 20(*a*) the system 10 determines which of the typical major expenses this user is concerned with, FIG. 20(*b*) determines how many children the user has, FIG. 20(*c*) determines when those children are expected to be in post-secondary education, and FIG. 20(*d*) determines if the children expect to live at home during that time, based on a selection from FIG. 20(*a*) indicating that child's education is important. FIGS. 20(*e*) through 20(*h*) continue with education related questions such as how much the user expects to spend annually on education, how much has been saved, how much saving is ongoing, and what financial accounts (e.g. RESP) are being used for same.

The prospective client UI 300 can display a second education page 340 as shown in FIG. 21. The second education page 340 enables the prospective client 30 to customize their education savings goal(s). Different schools can be selected, and the prospective client module 14 may update the savings goal to match the cost of the different schools. If default box 341 is selected, the savings goal represents the average cost of educational institutions in a certain region. The type of educational institution and geographical region used to calculate the average cost, for example colleges in Ontario or universities in Canada, can be selected using drop down options 343. If a specific educational institution is selected in entry box 342, the savings goal represents the total cost of attending the specific educational institution. FIG. 21 also shows the second education page when a specific educational institution is selected in entry box 342. Dialogue boxes 346 showing facts about the educational institution are displayed, along with the total projected cost 348. The information displayed in the dialogue boxes 346 and the total projected cost 348 may be retrieved from the schools and tuition database 114. That is, as shown in FIG. 21, the information contained in the database 58 can be leveraged to provide additional information in real-time to access updated contextual and relevant information that enables the client to consider and think more about the specific financial goal being considered. It can be appreciated that the additional information provided in FIG. 21 can be provided in similar GUI screens for each of the pillars discussed herein. For example, information from the database 58 can be leveraged to provide average insurance costs, average costs for critical illnesses, etc.

Figure 22A:
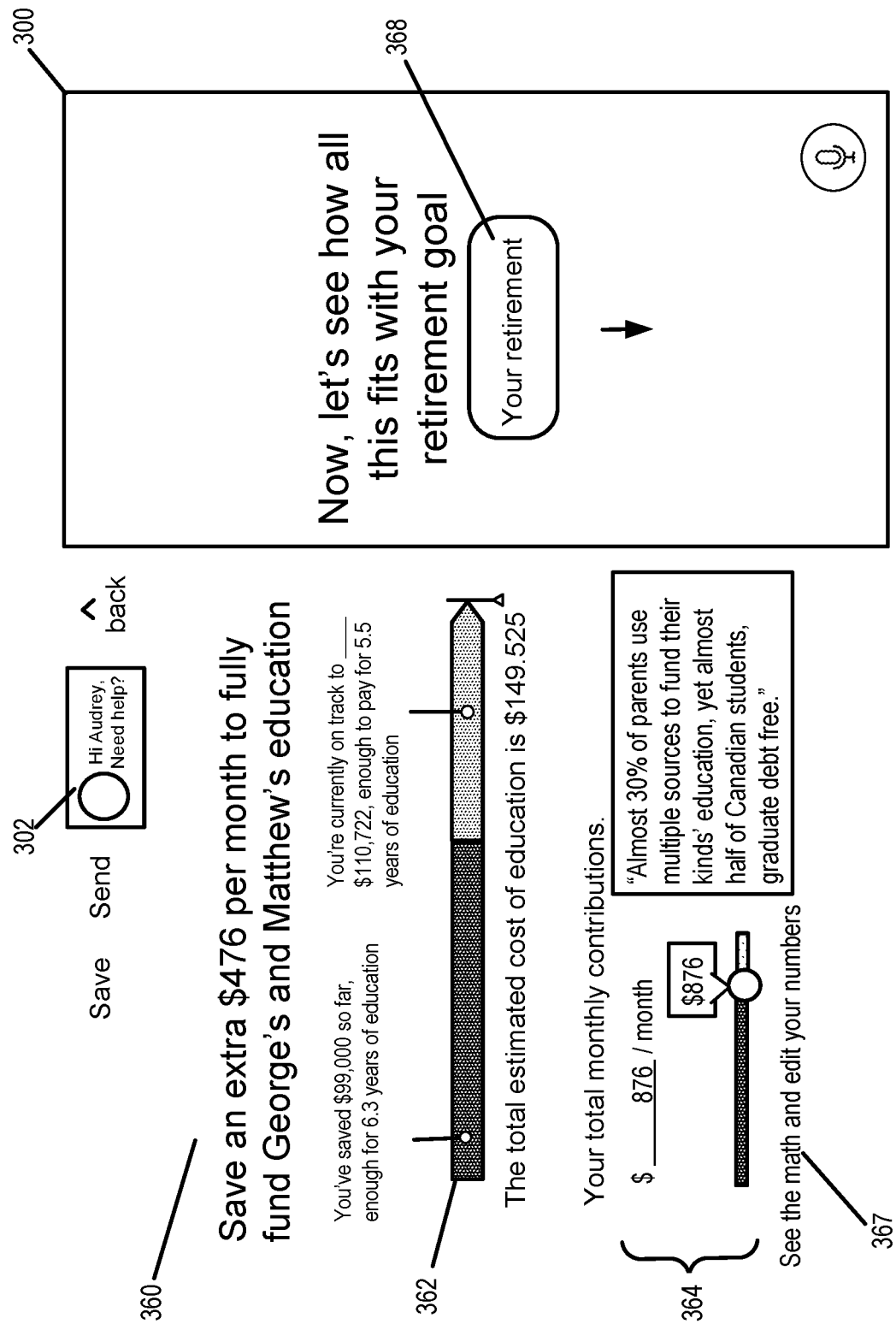
Figure 22B:
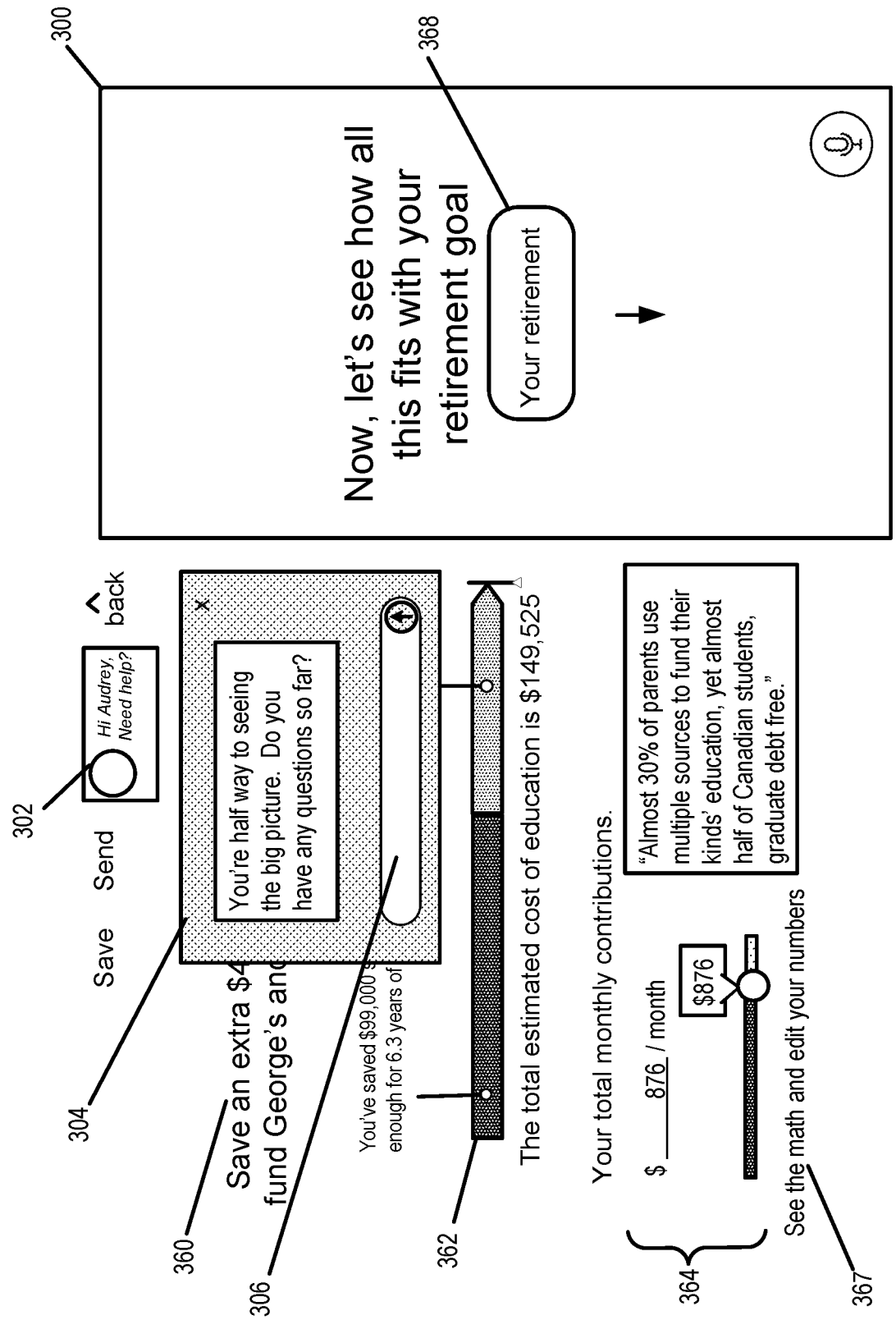

After detecting selection of the continue option 344, an education summary page 360 can be displayed, as illustrated in FIG. 22(a). A savings status 362 is shown, illustrating the progress made by the prospective client 30 towards achieving the educational saving goal. In this example, the savings status 362 illustrates the amount saved so far, the total estimated cost of the education, and how much the prospective client is projected to save based on their saving plan. An advisor popup 304 may appear to prompt the prospective client 30 to begin communication with the advisor 34, as illustrated in FIG. 22(b). The popup 304 can be linked to a chat bot or a live call center employee, an online advisor, or may employ both automated chat bot and live person functionality. The prospective client 30 can see the effect of a different saving plan by entering a different monthly contribution in one or more entry fields 364. By clicking button 367, the prospective client 30 can see and edit the information and assumptions used to calculate the values displayed in the savings status 362 (not illustrated). The prospective client 30 can also keep the savings plan by selecting the continue option 368.

FIGS. 23(a) through 23(d) illustrate GUI pages that would be presented if the user had selected a major purchase in FIG. 20(a). In this example, the system 10 determines when the user plans to make this purchase, how much they need to save, how much has been saved so far, and how much they can save per year for this expense.

FIGS. 23(e) through 23(g) illustrate GUI pages that would be presented if the user had selected paying off debts in FIG. 20(a). In this example, the system 10 determines when the user wants to pay off the debt(s), much of that debt they plan to pay off, and how much they can pay down monthly.

Figure 24:
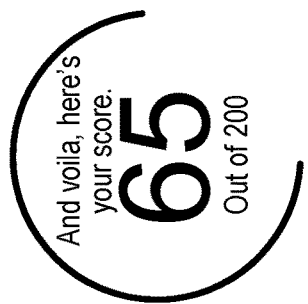

As illustrated in FIG. 24, after stepping the user through the different aspects, a final score page can be displayed. It can be seen from FIG. 24 that optionally the system 10 can activate the "connect with us" button only after taking the user through the entire process.

Figure 25:
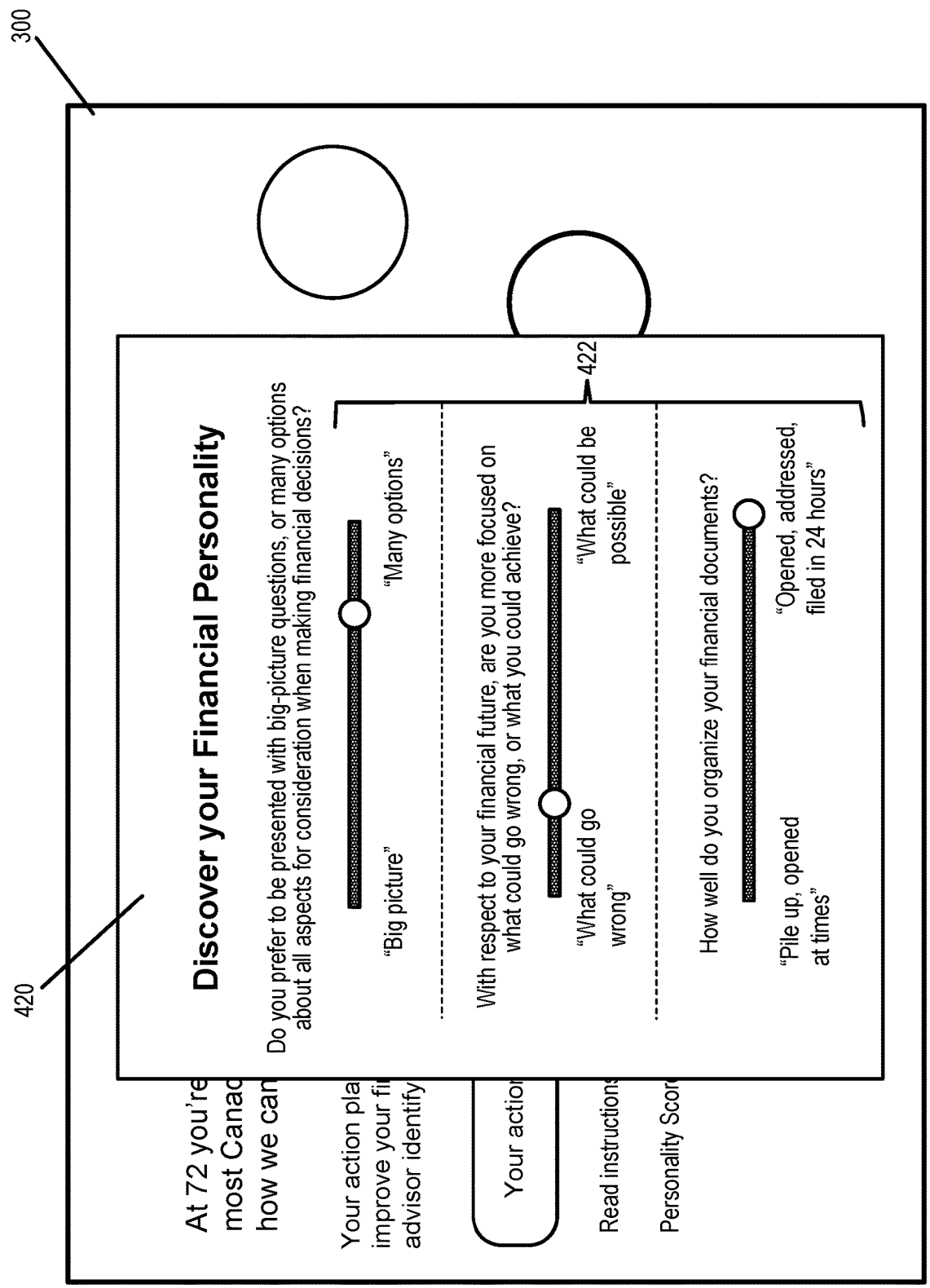
Figure 26:
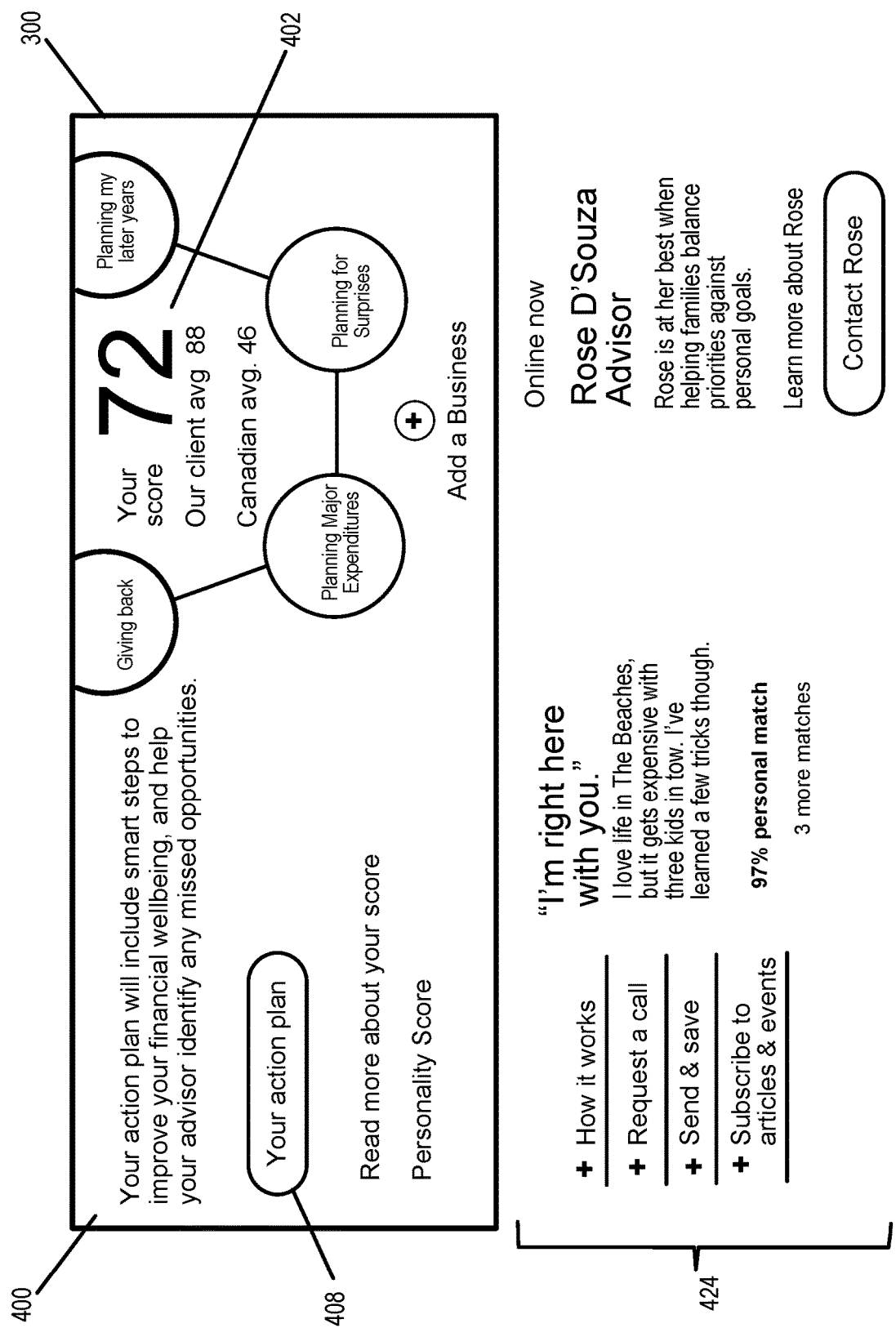

A personality score option can also be generated. Selecting the personality score option can display a financial personality window 420 as shown in FIG. 25, wherein the prospective client can answer questions 422 related to their financial personality. The financial personality questions 422 can be used by the system 10 as additional information to match clients with advisors or to order recommendations by importance based on that client's personality traits. As shown in FIG. 26, the bottom of a results page 400 may also display an advisor biography along with a set of action items 424 for taking the next steps, e.g., with an advisor 34 matched to the prospective client 30. In FIG. 26, a "your action plan" option 408 can be selected to view the client's recommendations, and the options 424 can be selected to take such next steps. For example, the client can select "send and save" to generate a link that is communicated to the prospective client (e.g. via email, text message, etc.). In this way, the client can use the link to revisit their assessment without having to start over. The platform 12 can therefore save progress data for prospective clients to enable them to reengage later to become an active client. The prospective client may also select the "request a call" option to initiate a callback from an advisor, e.g., after the system 10 matches the prospective client with a suitable advisor (e.g., based on location, expertise, etc.).

Figure 27A:
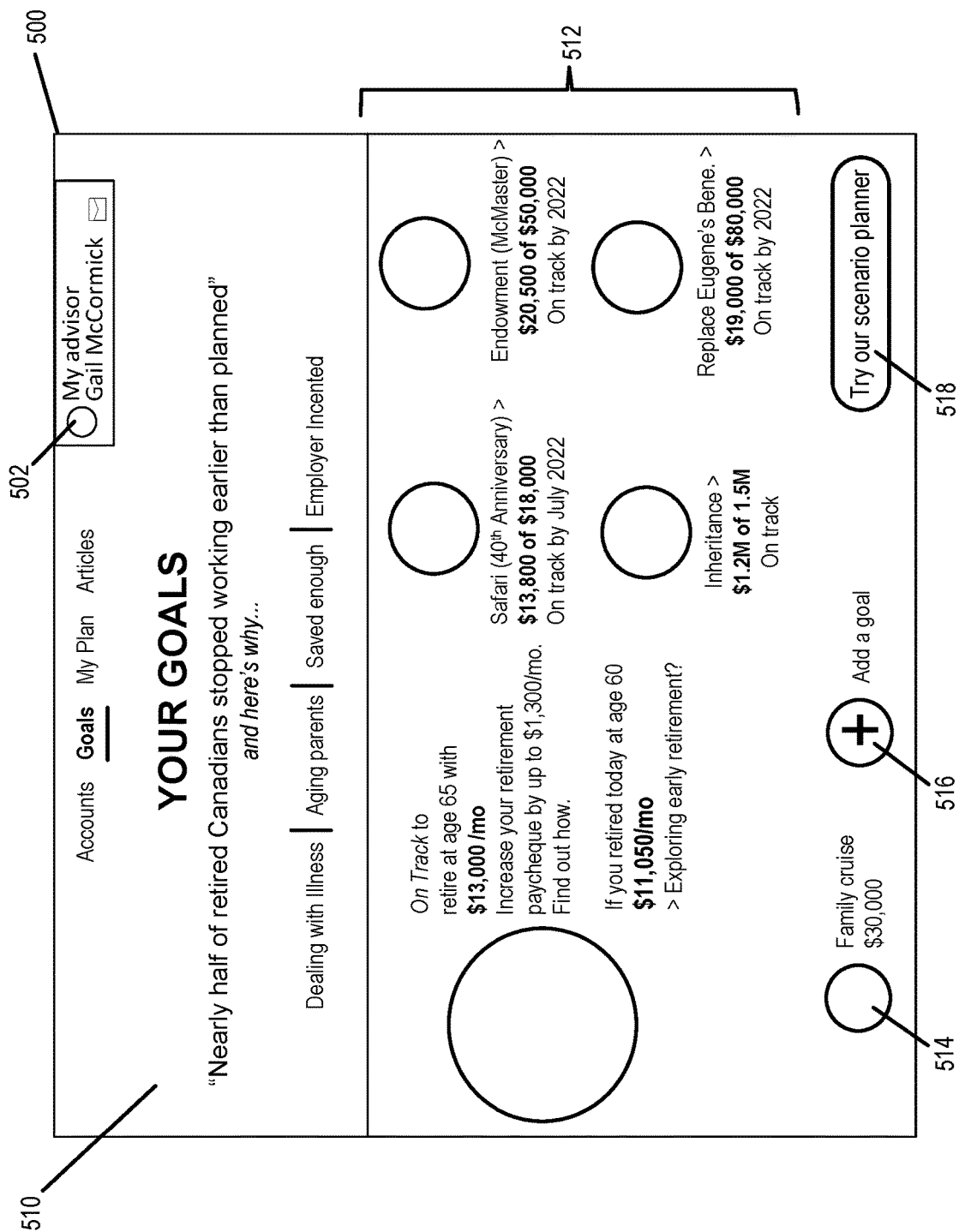

A screen shot of an example active client user interface (UI) 500 is illustrated in FIG. 27(a). The active client UI 500 may be displayed on any device, for example the active client device 33. An advisor button 502 is displayed on the active client UI 500, enabling the active client 32 to initiate a conversation with the advisor 34 at any time. FIG. 27(a) illustrates the active client UI displaying a goals page 510. The goals page 510 contains information related to goals identified by the active client 32. The goals page 510 includes a progress display 512, showing all the goals identified by the active client 32 and the progress the active client 32 has made towards meeting those goals. It can be appreciated that the "Exploring Early Retirement?" link can be used to trigger the retirement planner 530. The "Try our scenario planner" option can be used to trigger a more generic planner, which would provide an option to go to the retirement planner 530. The goals page 510 also includes a goal reactivation button 514, a new goal button 516, and a scenario planning button 518. Selecting the goal reactivation button 514 will activate a previously deactivated goal, as described in greater detail below. Selecting the new goal button 516 allows the active client 32 to add a new goal to their savings plan. Selecting the scenario planner button 518 allows the active client 32 to modify the retirement plan, as described in greater detail below.

FIG. 27(b) illustrates a financial wellbeing page 520. The financial wellbeing page 520 displays a financial wellbeing score 522 calculated by the active client module 16, a review retirement philosophy option 524, and an appointment scheduler 526. The appointment scheduler 526 allows the active client 32 to schedule an appointment with the advisor 34.

Figure 28A:
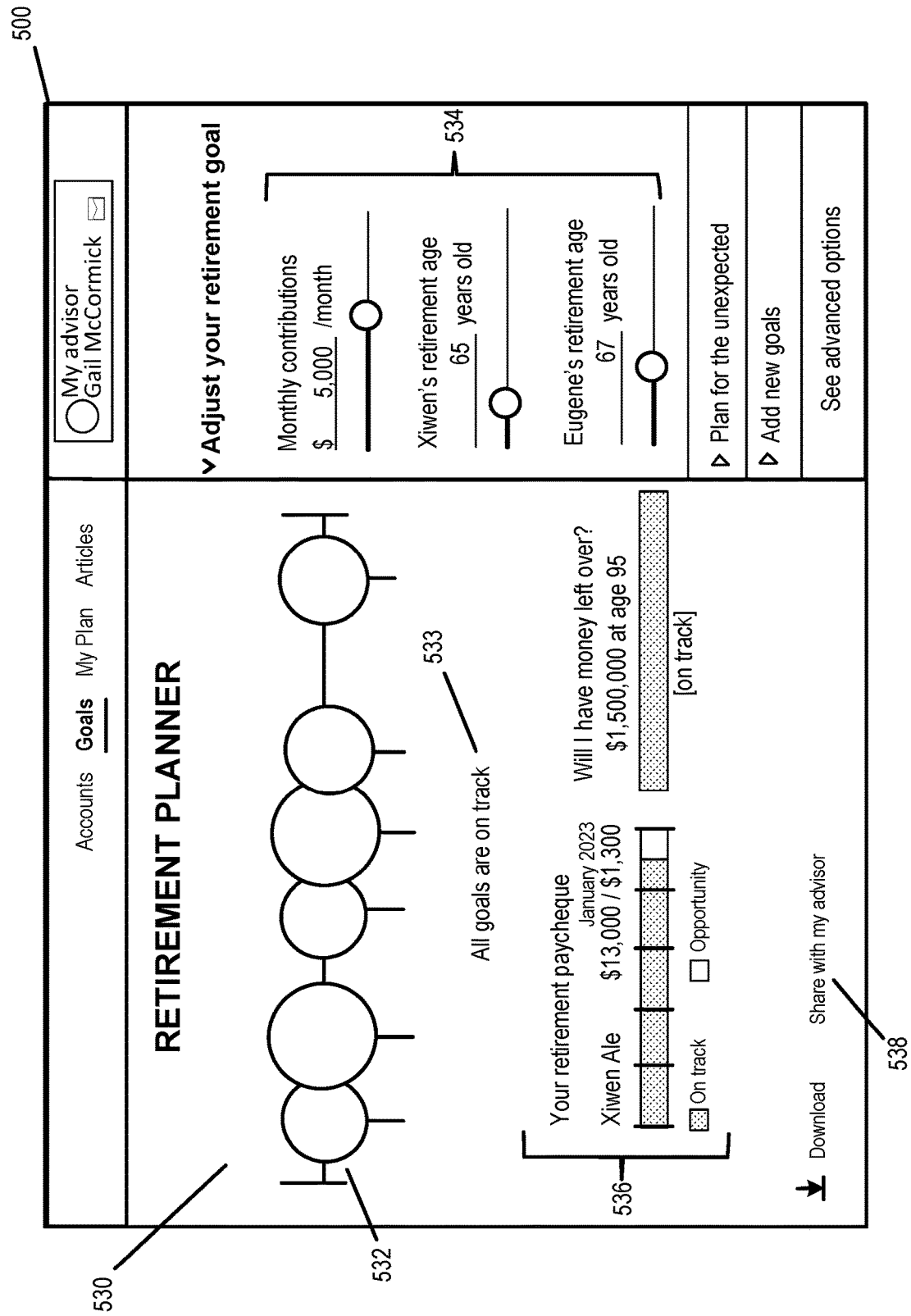
Figure 28B:
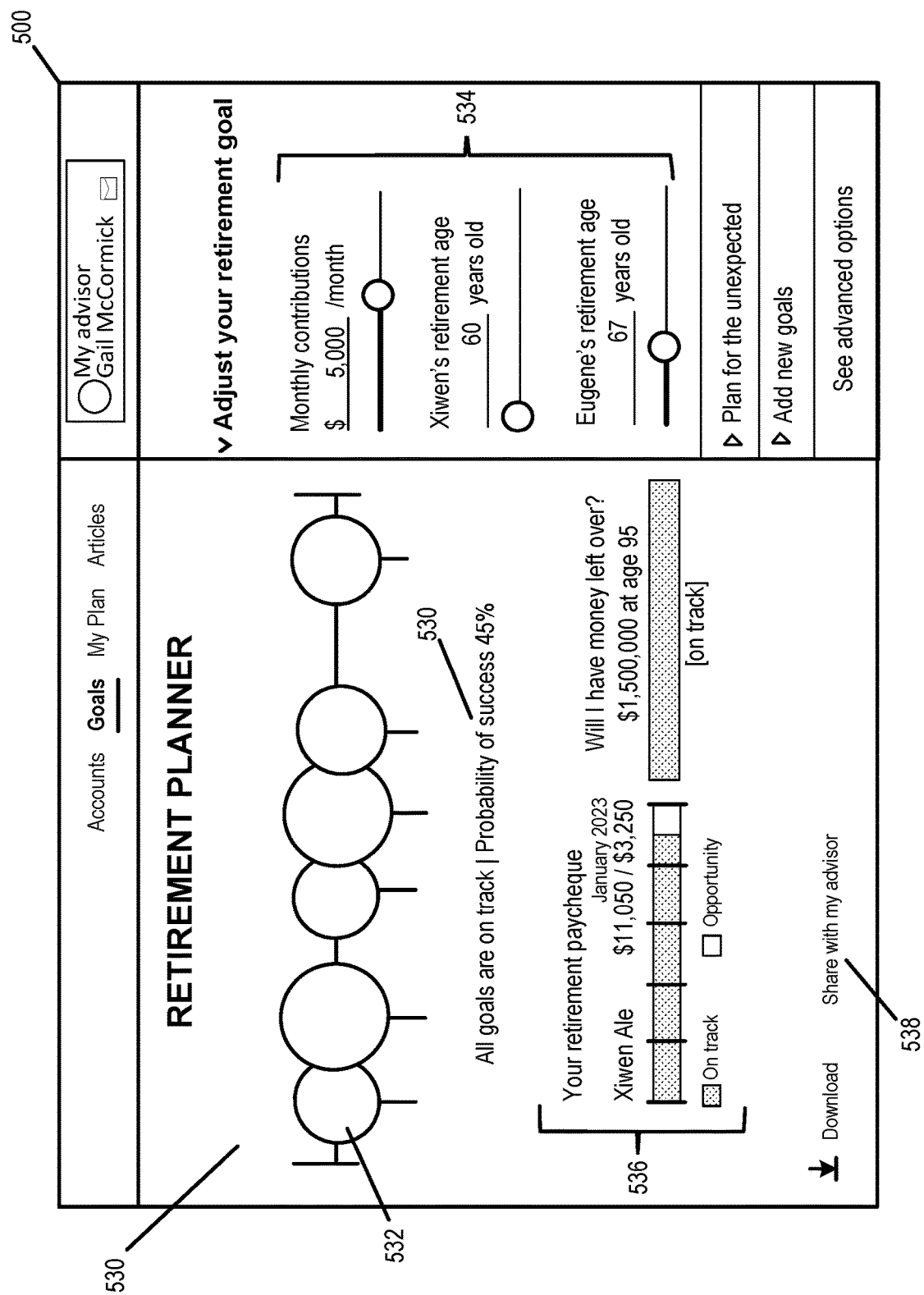

Upon detecting the selection of the scenario planner button 518 or the "Exploring early retirement link (not numbered), the active client UI 500 displays a retirement planning page 530, as shown in FIGS. 28(a) and 28(b). The retirement planning page 530 displays a timeline of the financial goals 532, a goals status 533, and a retirement status 536. A plan modification section 534 allow the active client 32 to make a modification to their retirement plan, for example by retiring at a different age, adding a new goal, or making a different monthly contribution. The timeline 532, goal status 533, and retirement status 536 can be updated in real time. As such, the active client 32 can immediately see how a change to the retirement plan affects their goals. In the example shown in FIGS. 28(a) and 28(b), the modification made to the retirement plan in the plan modification section 534 resulted in one goal being put off track, as indicated by the goal status 533.

Figure 29A:
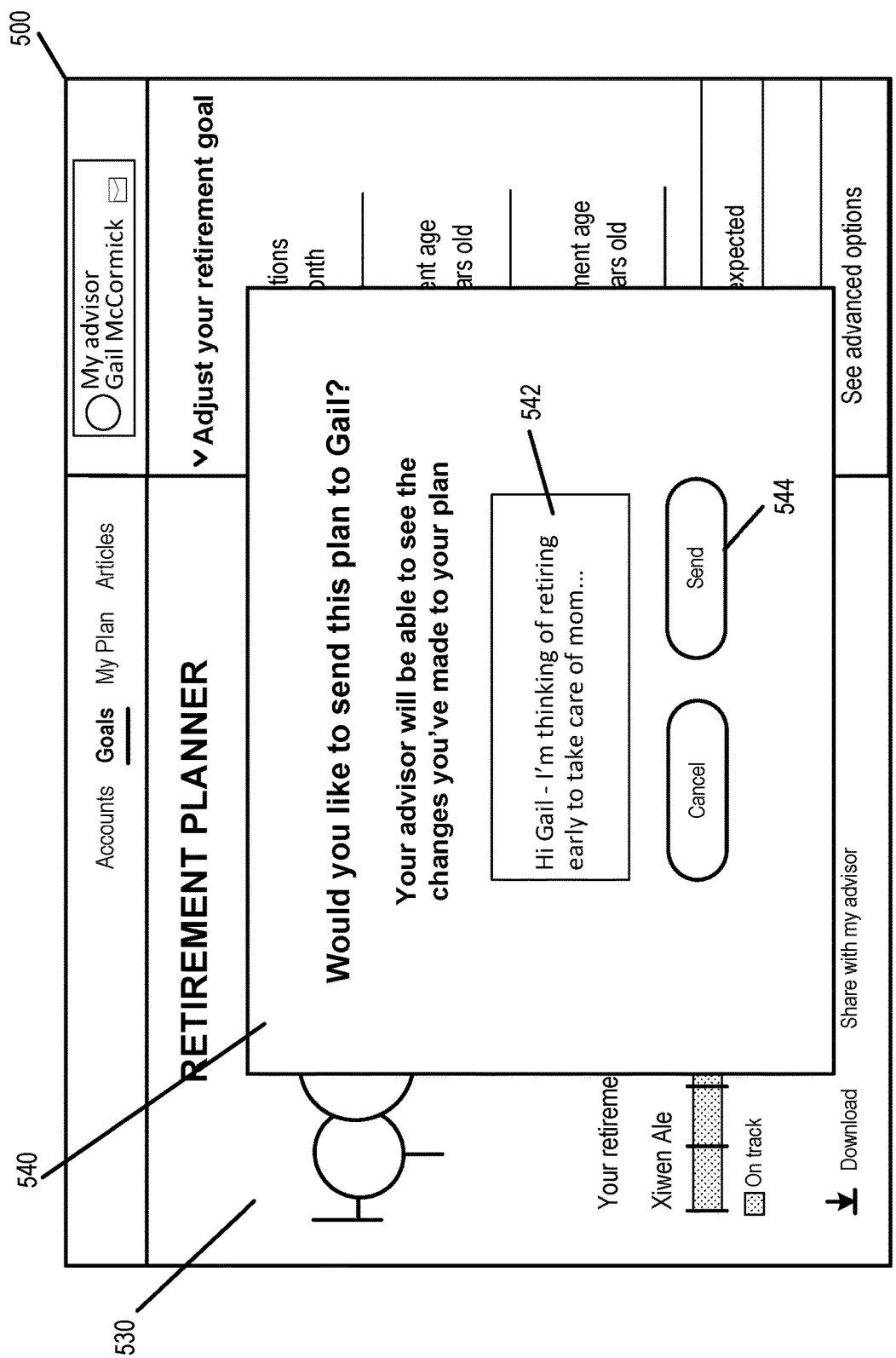
Figure 29B:
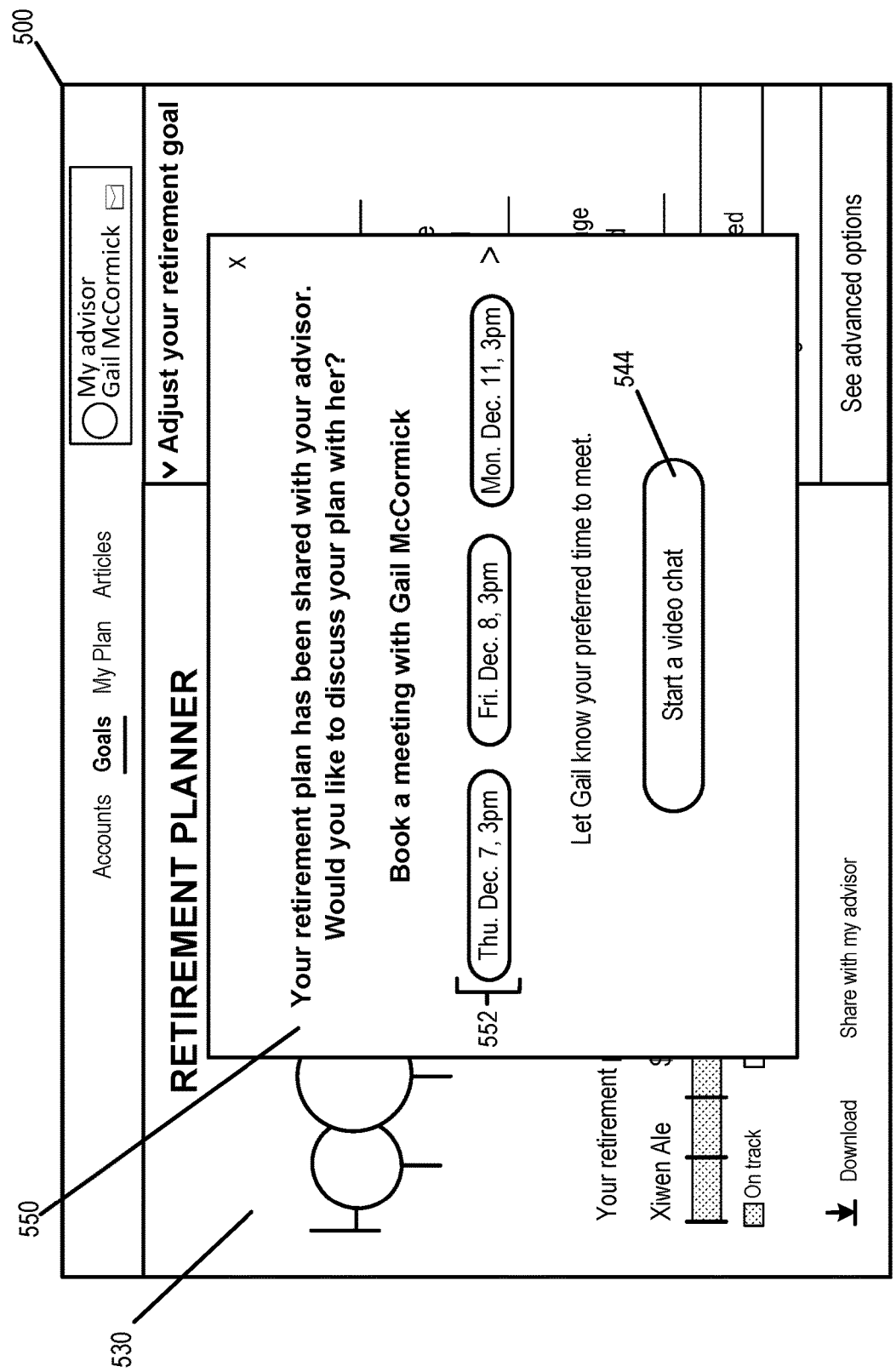

The active client 32 may propose the modified retirement plan to the advisor 34 by selecting a share with advisor button 538. As shown in FIG. 29(a), upon the selection of the share with advisor button 538, an advisor contact window 540 opens. The active client 32 can enter a message to the advisor 34 in a text field 542, for example to explain the modified retirement plan, and send the message and proposed modification to the advisor 34 by selecting a send button 544.

Upon detecting the selection of the send button 544, the advisor contact window 540 is closed and a meeting scheduling window 550 opens. The meeting scheduling window 550 allows the active client 32 to schedule a meeting with the advisor 34 by selecting an available time using the buttons 552, or by initiating a video chat with the advisor 34 by selecting the button 554.

Figure 30A:
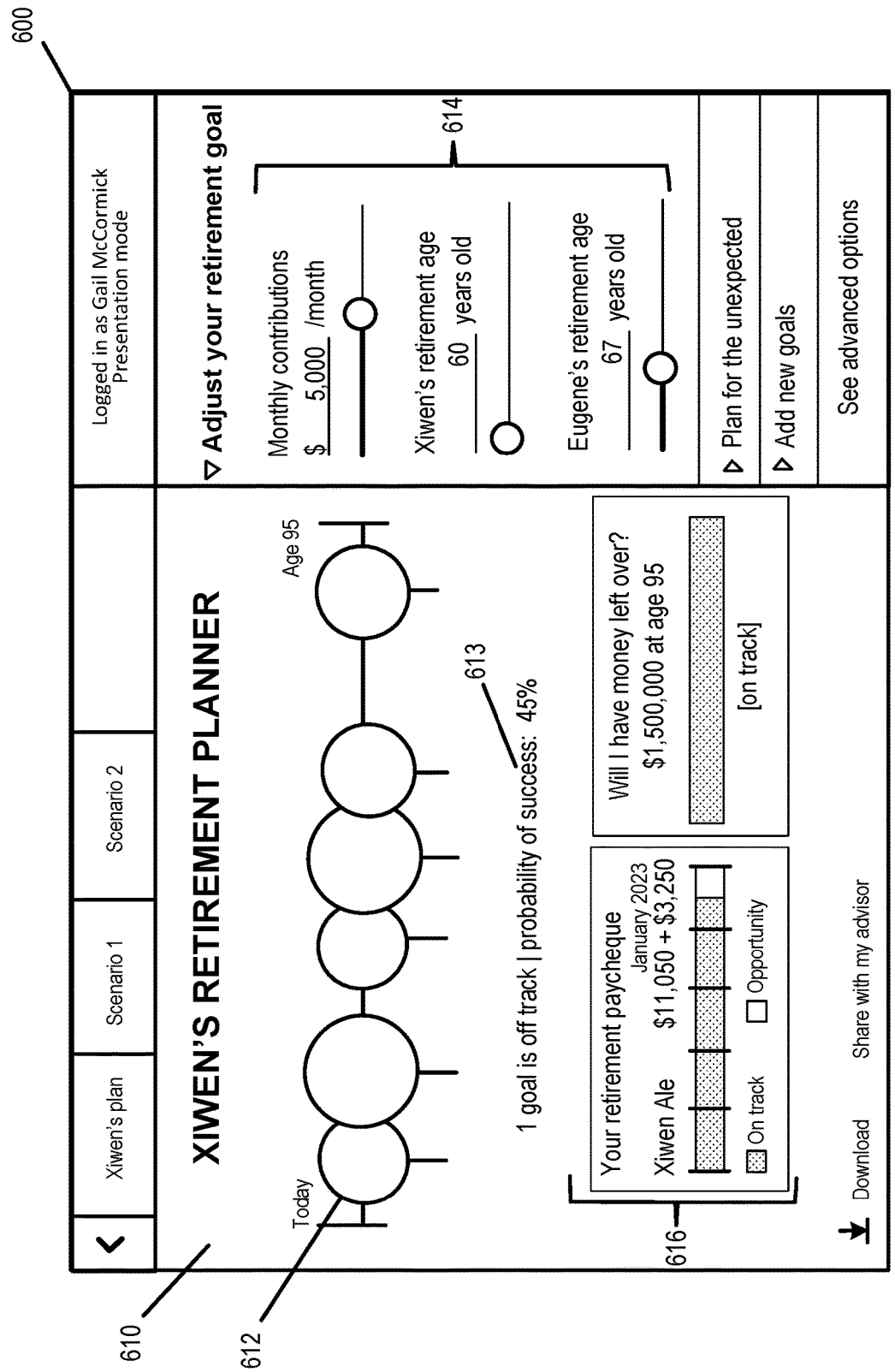
Figure 30B:
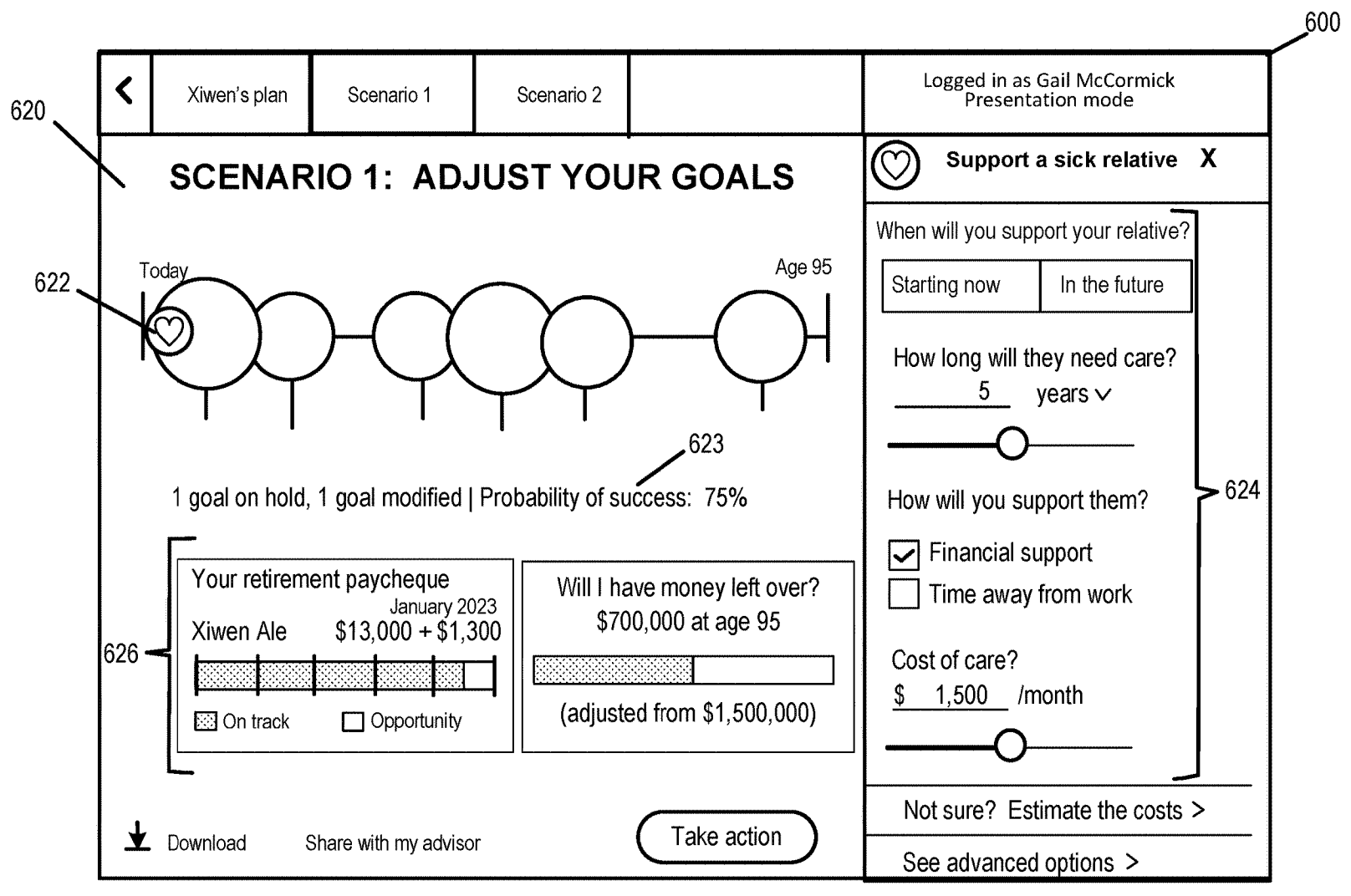
Figure 30C:
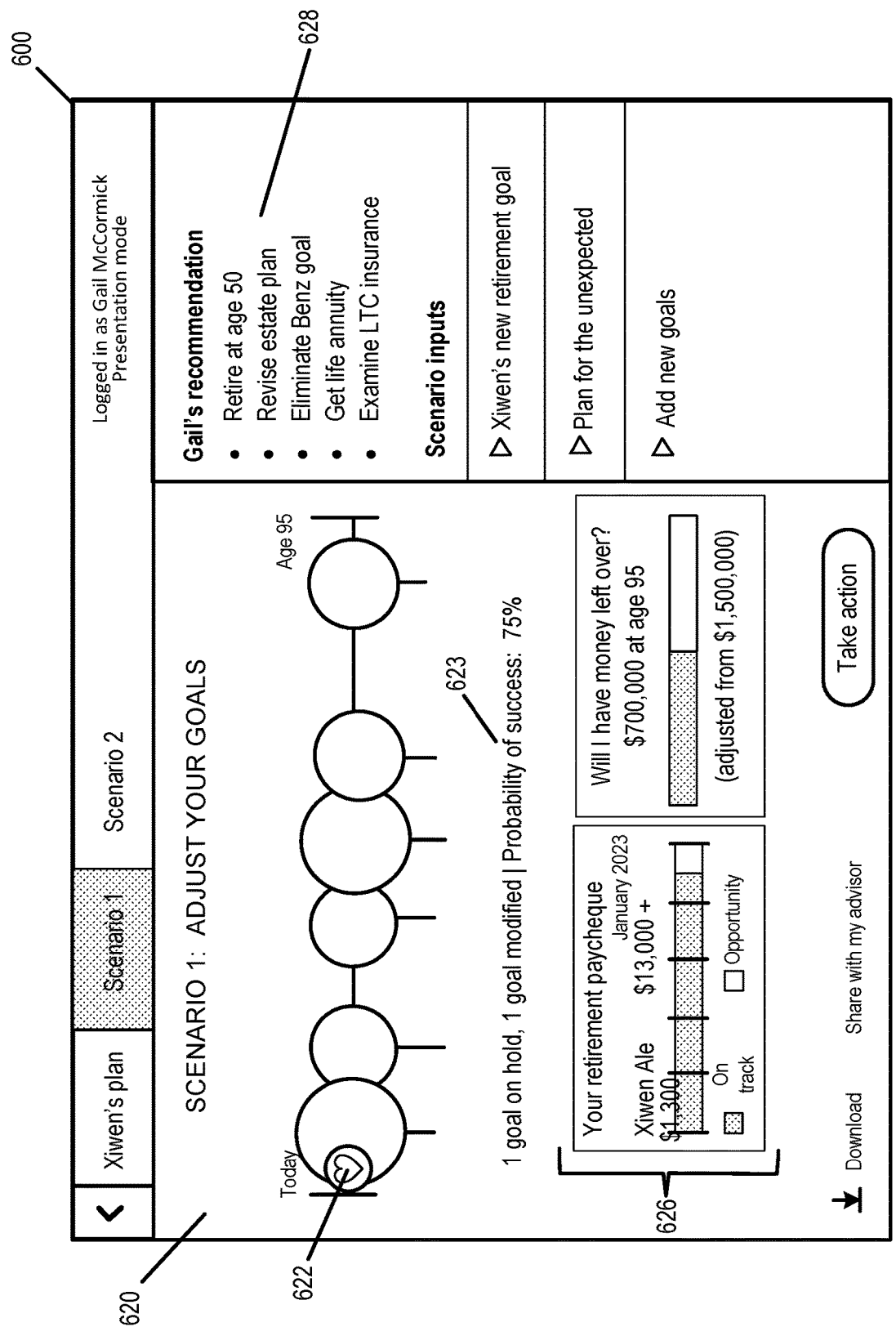

A screen shot of an example advisor user interface (UI) 600 is illustrated in FIGS. 30(*a*) through 30(*c*). The advisor UI 600 may be displayed on any device, for example the advisor device 35. Upon receiving the modified retirement plan proposed by the active client 32, the advisor module 18 may be configured to display a requested change page 610 on the advisor UI 600, as illustrated by FIG. 30(*a*). The requested change page 610 displays information related to the active client's retirement plan, goals, and the proposed modification. In this example, the requested change page 610 includes a timeline 612, proposed plan changes 614, a retirement status 616, and a goal status 613. In this example, the goal status 613 indicates the number of goals that are at risk of not being achieved, and the probability of successfully achieving all of the saving goals.

The advisor 34 can open a scenario page 620 to generate one or more scenarios that may occur due to the modified retirement plan proposed by the active client 32, as shown in FIGS. 30(*b*) and 30(*c*). The advisor 34 can use a plan modification section 624 to modify events, goals, and the retirement plan in order to create the one or more scenarios. The one or more scenarios may result in a modified timeline 622, a changed retirement status 626, and/or a changed goal status 613. The advisor 34 may recommend actions 628 to the active client 32 in order to help the active client 32 achieve as many goals as possible with the modified retirement plan. For example, the advisor 34 may recommend deactivating one goal and reallocating the savings previously assigned to that goal.

Figure 32:
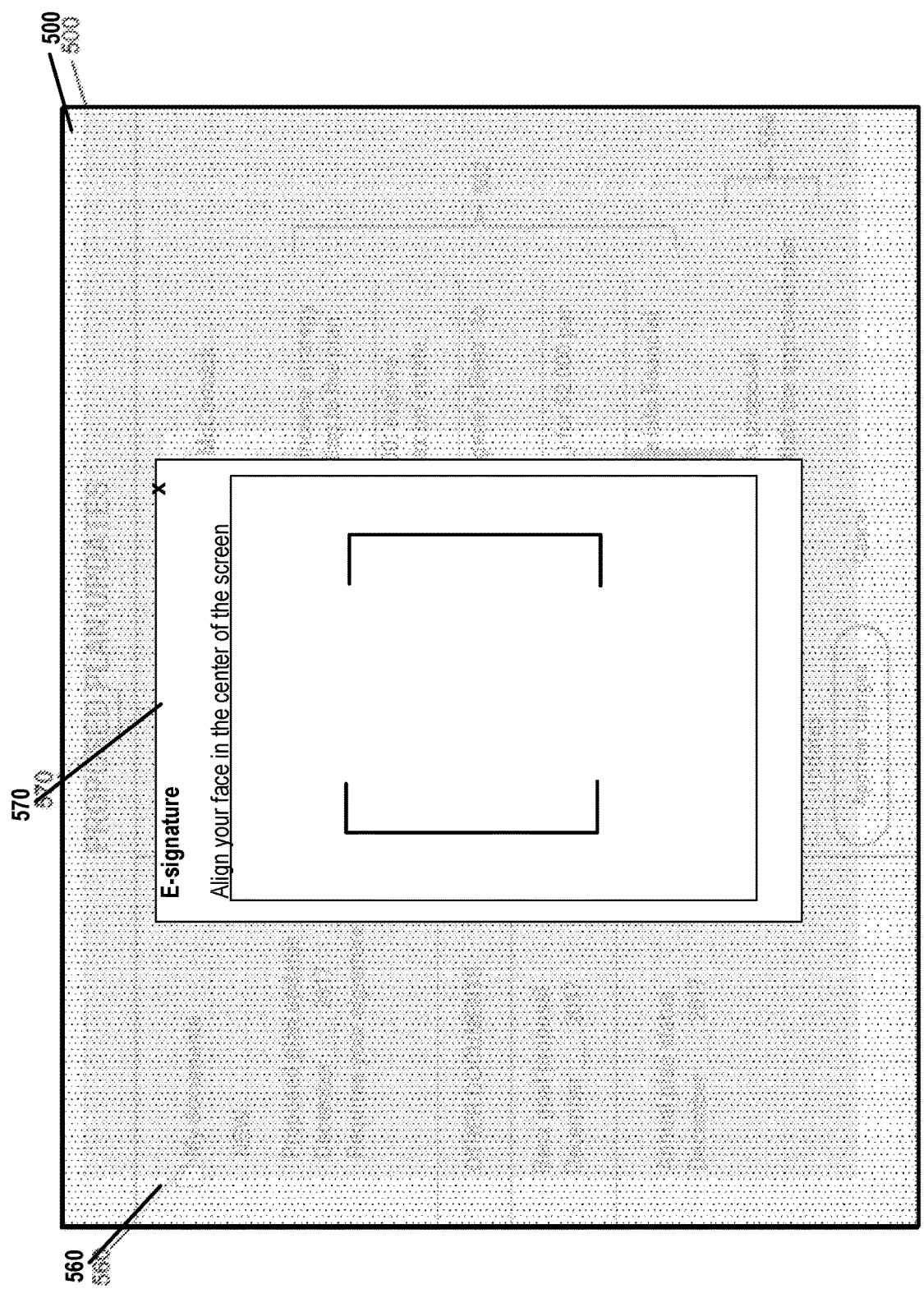
Figure 33:
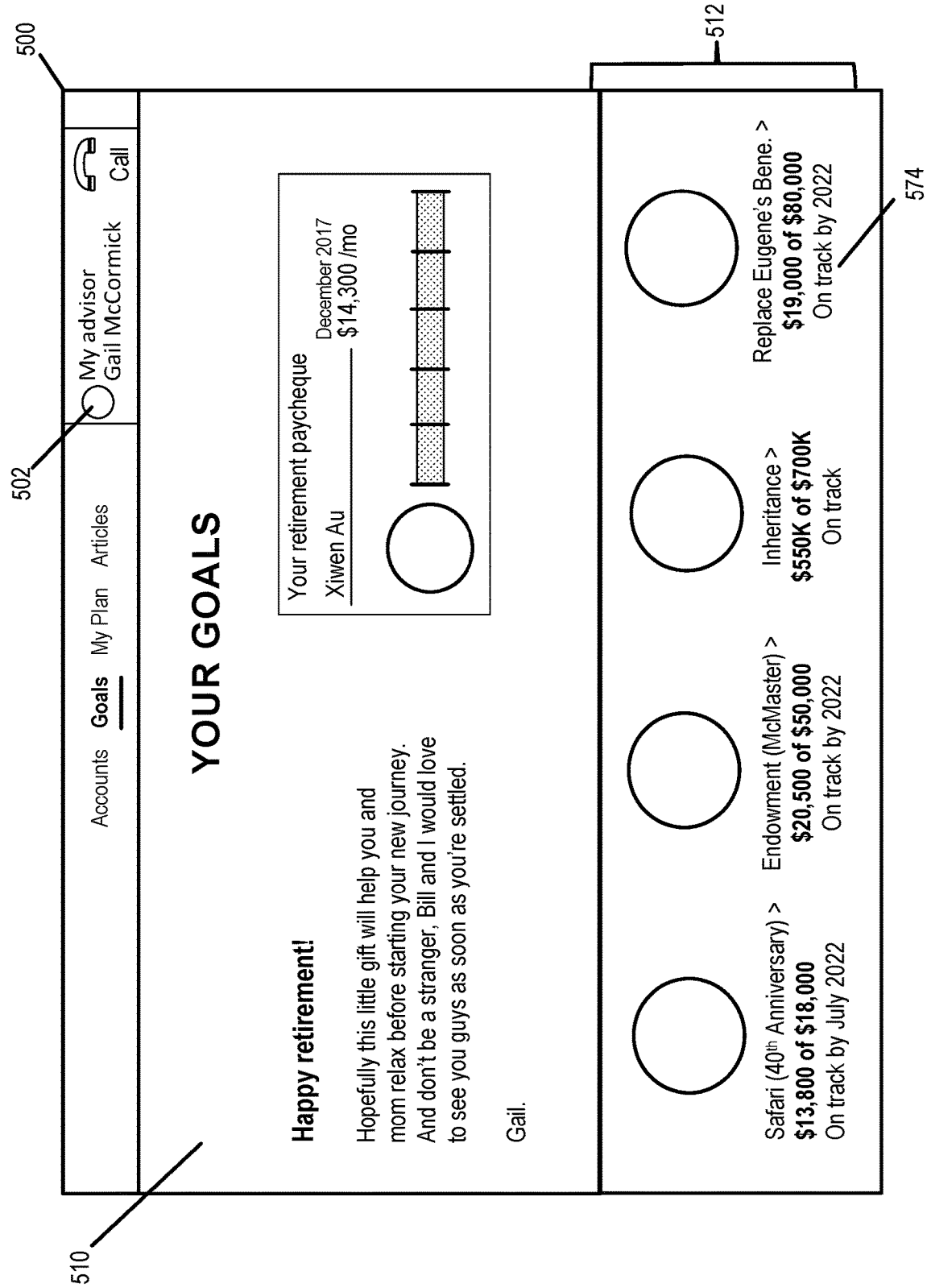

FIG. 31 illustrates the active client UI 500 displaying a plan update page 560, after receiving the scenario and recommended actions from the advisor 34. The plan update page 560 lists a set of detailed recommended actions 562 suggested by the advisor in light of the proposed retirement plan modification. Upon reviewing the recommended actions 562, the client can select consent buttons 564 and approve the changes to the retirement plan by selecting approval button 566. As illustrated in FIG. 32, upon selection of the approval button 566, a verification window 570 is opened, allowing the system 10 to confirm that the active client 32 is approving the changes. The active client 32 may be verified by a photograph taken by a webcam, a signature, or any other method. Upon verification of the active client 32 by the verification window 570, the active client UI 500 returns to the goals page 510. The changes made to the retirement plan are shown on the goals page 510 as shown in FIG. 33, for example a deactivated goal may appear lighter in the progress display 512. The active client 32 may select a reactivate option 574 to reactivate the deactivated goal.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the testing tool 12, any component of or related to the computing environment 10, etc., or accessible or connectable thereto. Any application or module herein described may be implemented using computer readable/executable instructions that may be stored or otherwise held by such computer readable media.

Although the above principles have been described with reference to certain specific examples, various modifications thereof will be apparent to those skilled in the art as outlined in the appended claims.

The invention claimed is:

1. A system for integrating data used in computing financial wellbeing scores, the system comprising:
   at least one computing device configured to provide a computing platform, the computing platform providing:
   an active client module providing an interface for communicating with active client devices, wherein the active client module comprises a graphical user interface for interacting with the active client devices, the graphical user interface being integrated with a forecast module and an optimizer module to enable a financial wellbeing score to be generated and reassessed in real-time by interacting with elements in the graphical user interface;
   a prospective client module providing an interface for communicating with prospective client devices;
   an advisor module providing an interface for communicating with advisor devices;
   the forecast module;
   the optimizer module configured to analyze datasets from multiple sources and to
   generate recommendations to optimize strategies to achieve financial outcomes; and
   a database storing financial planning data;
   an integration layer interposed between the computing platform and a book of record to enable client data in the book of record to be accessed; and
   a financial planning software module independent of the computing platform, configured to generate financial plan data integrated by the computing platform in financial wellbeing scores and recommendations;
   wherein the computing platform is configured to, in real time:

obtain, by the computing platform, survey research data;
obtain, by the computing platform, statistical analysis data;
obtain, by the computing platform, inhouse financial planning expertise;
access, by the computing platform, data from the book of record for an active client, wherein the book of record includes financial projections and scenario analysis results;
obtain, by the computing platform using the financial planning software from the active client module, data from the book of record, active client information and a current active client financial plan for the active client;
generate, by the computing platform using the financial planning software, active client forecasting results from the survey research data, the statistical analysis data, the inhouse financial planning expertise, the data from the book of record, the active client information and the current active client financial plan;
acquire, by the computing platform using the optimizer module and from the financial planning software, the active client information and the active client financial plan;
analyze, by the computing platform using the optimizer, future cashflows by scenarios;
generate, by the computing platform using the optimizer module, forecast information based on the future cashflows, the active client information and the active client financial plan;
determine, by the computing platform using the optimizer module, a financial plan value of the financial plan based on the forecast information and the inhouse financial planning expertise;
generate, by the computing platform and based on the financial plan value, the financial wellbeing score for at least one of the active client module, or the advisor module being accessed by a respective device;
determine, by the computing platform using the optimizer module, a quality of the financial plan based on the financial plan value;
modify, by the computing platform using the optimizer module, the financial plan to create a modified financial plan, in response to the quality of the financial plan being lower than a threshold;
acquire, by the computing platform using the optimizer module, approximations of the active client information and the active client financial plan, without having to send a request to the financial planning software;
determine, by the computing platform using the optimizer module, a modified financial plan value of the modified financial plan based on the approximations of modified forecast information of the modified financial plan and the inhouse financial planning expertise;
generate, by the computing platform and based on the modified financial plan value, an advanced financial wellbeing score for at least one of the active client module, or the advisor module being accessed by a respective device;
identify, by the computing platform using a machine learning algorithm, other clients that have the financial wellbeing score or the advanced financial wellbeing score that is within a threshold amount from the financial wellbeing score or the advanced financial wellbeing score of the active client, along with similar of the data from the book of record, the active client information and the current active client financial plan;
generate, by the computing platform using a machine learning algorithm, peer-based financial plan recommendations and a peer-based financial wellbeing score;
normalize, by the computing platform using a machine learning algorithm, the peer- based financial plan recommendations and the peer-based financial wellbeing score based on age and demographics; and
determine, by the computing platform using a machine learning algorithm, how close the financial planning for the active client is to the other clients.

2. The system of claim 1, wherein the computing platform is further configured to, in real time:
obtain, by the computing platform using the financial planning software from the prospective client module, prospective client information and a current prospective client financial plan for a prospective client; and
generate, by the computing platform using the financial planning software, prospective client forecasting results from the survey research data, the statistical analysis data, the inhouse financial planning expertise, the prospective client information and the current prospective client financial plan;
acquire, by the computing platform using the optimizer module and from the financial planning software, the prospective client information and the current prospective client financial plan;
generate, by the computing platform using the optimizer module, forecast information further based on the prospective client information and the current prospective client financial plan; and
generate, by the computing platform and based on the financial plan value, a financial wellbeing score for the prospective client module.

3. The system of claim 2, wherein the computing platform is further configured to access the third party data in real time to generate the financial wellbeing score based on newly available data.

4. The system of claim 2, wherein the database is populated with the third party data.

5. The system of claim 1, wherein the computing platform is further configured to generate at least one recommendation to provide with the financial wellbeing score.

6. The system of claim 1, wherein the forecast module is an integral part of the financial planning software module.

7. The system of claim 1, wherein the computing platform is configured to: generate a core financial plan assessment from survey research and statistical analyses, the book of record data for a client including financial projections and scenario analysis results, and in-house financial planning expertise.

8. The system of claim 7, wherein the computing platform is configured to: access active or prospective client information including a current financial plan; and use the client information and the core financial plan assessment to generate the financial wellbeing score and at least one recommendation to improve financial wellbeing.

9. The system of claim 1, wherein the computing platform is configured to:
access active or prospective client information including a current financial plan; and
use the current financial plan to perform forecasting-scenario modelling.

10. The system of claim 1, wherein the computing platform is configured to generate a peer-based financial plan recommendation.

11. The system of claim 1, wherein the computing platform is configured to:

access active or prospective client information including a current financial plan;

obtain at least one proposed change to the financial plan input by the client;

and execute a real-time reassessment of the financial wellbeing score and generate at least one recommendation.

12. A method for integrating data used in computing financial wellbeing scores, the method comprising:

using a computing device to provide a computing platform, the computing platform providing:

an active client module providing an interface for communicating with active client devices, wherein the active client module comprises a graphical user interface for interacting with the active client devices, the graphical user interface being integrated with a forecast module and an optimizer module to enable a financial wellbeing score to be generated and reassessed in real-time by interacting with elements in the graphical user interface;

a prospective client module for communicating with prospective client devices; an advisor module providing an interface for communicating with advisor devices;

the forecast module;

the optimizer module configured to analyze datasets from multiple sources and to generate recommendations to optimize strategies to achieve financial outcomes; and a database storing financial planning data;

providing an integration layer interposed between the computing platform and a book of record to enable client data in the book of record to be accessed;

enabling access to a financial planning software module independent of the computing platform, configured to generate financial plan data integrated by the computing platform in financial wellbeing scores and recommendations;

operating the computing platform in real time to:

obtain, by the computing platform, survey research data;

obtain, by the computing platform, statistical analysis data;

obtain, by the computing platform, inhouse financial planning expertise;

access, by the computing platform, data from the book of record for an active client, wherein the book of record includes financial projections and scenario analysis results;

obtain, by the computing platform using the financial planning software from the active client module, data from the book of record, active client information and a current active client financial plan for the active client;

generate, by the computing platform using the financial planning software, active client forecasting results from the survey research data, the statistical analysis data, the inhouse financial planning expertise, the data from the book of record, the active client information and the current active client financial plan;

acquire, by the computing platform using the optimizer module and from the financial planning software, the active client information and the active client financial plan;

analyze, by the computing platform using the optimizer, future cashflows by scenarios;

generate, by the computing platform using the optimizer module, forecast information based on the future cashflows, the active client information and the active client financial plan;

determine, by the computing platform using the optimizer module, a financial plan value of the financial plan based on the forecast information and the inhouse financial planning expertise;

generate, by the computing platform and based on the financial plan value, the financial wellbeing score for at least one of the active client module, or the advisor module being accessed by a respective device;

determine, by the computing platform using the optimizer module, a quality of the financial plan based on the financial plan value;

modify, by the computing platform using the optimizer module, the financial plan to create a modified financial plan, in response to the quality of the financial plan being lower than a threshold;

acquire, by the computing platform using the optimizer module, approximations of the active client information and the active client financial plan, without having to send a request to the financial planning software;

determine, by the computing platform using the optimizer module, a modified financial plan value of the modified financial plan based on the approximations of modified forecast information of the modified financial plan and the inhouse financial planning expertise;

generate, by the computing platform and based on the modified financial plan value, an advanced financial wellbeing score for at least one of the active client module, or the advisor module being accessed by a respective device;

identify, by the computing platform using a machine learning algorithm, other clients that have the financial wellbeing score or the advanced financial wellbeing score that is within a threshold amount from the financial wellbeing score or the advanced financial wellbeing score of the active client, along with similar of the data from the book of record, the active client information and the current active client financial plan;

generate, by the computing platform using a machine learning algorithm, peer-based financial plan recommendations and a peer-based financial wellbeing score;

normalize, by the computing platform using a machine learning algorithm, the peer-based financial plan recommendations and the peer-based financial wellbeing score based on age and demographics; and determine, by the computing platform using a machine learning algorithm, how close the financial planning for the active client is to the other clients.

13. The method of claim 12, wherein the computing platform further comprises at least one third party application programming interface (API) to enable access to third party data, wherein the method further comprises using the at least one third party API to access third party data.

14. The method of claim 13, wherein the computing platform is further configured to access the third party data in real time to generate the financial wellbeing score based on newly available data.

15. The method of claim 13, wherein the database is populated with the third party data.

16. The method of claim 12, further comprising generating at least one recommendation to provide with the financial wellbeing score.

17. The method of claim 12, wherein the forecast module is an integral part of the financial planning software module.

18. The method of claim 12, further comprising:
generating a core financial plan assessment from survey research and statistical analyses, the book of record data for a client including financial projections and scenario analysis results, and in-house financial planning expertise.

19. The method of claim 18, further comprising:
accessing active or prospective client information including a current financial plan;
and using the client information and the core financial plan assessment to generate the
financial wellbeing score and at least one recommendation to improve financial wellbeing.

20. The method of claim 12, further comprising:
accessing active or prospective client information including a current financial plan; and
using the current financial plan to perform forecasting-scenario modelling.

21. The method of claim 12, further comprising:
generating a peer-based financial plan recommendation.

22. The method of claim 12, further comprising:
accessing active or prospective client information including a current financial plan;
obtaining at least one proposed change to the financial plan input by the client; and
executing a real-time reassessment of the financial wellbeing score and generate at least one recommendation.

23. A non-transitory computer readable medium comprising computer executable instructions for:
using a computing device to provide a computing platform, the computing platform providing:
an active client module providing an interface for communicating with active client devices, wherein the active client module comprises a graphical user interface for interacting with the active client devices, the graphical user interface being integrated with a forecast module and an optimizer module to enable a financial wellbeing score to be generated and reassessed in real-time by interacting with elements in the graphical user interface;
a prospective client module providing an interface for communicating with prospective client devices;
an advisor module providing an interface for communicating with advisor devices;
the forecast module;
the optimizer module configured to analyze datasets from multiple sources and to generate recommendations to optimize strategies to achieve financial outcomes; and
a database storing financial planning data;
providing an integration layer interposed between the computing platform and a book of record to enable client data in the book of record to be accessed;
enabling access to a financial planning software module independent of the computing platform, configured to generate financial plan data integrated by the computing platform in financial wellbeing scores and recommendations;
operating the computing platform in real time to:
obtain, by the computing platform, survey research data;
obtain, by the computing platform, statistical analysis data;
obtain, by the computing platform, inhouse financial planning expertise;
access, by the computing platform, data from the book of record for an active client, wherein the book of record includes financial projections and scenario analysis results;
obtain, by the computing platform using the financial planning software from the active client module, data from the book of record, active client information and a current active client financial plan for the active client;
generate, by the computing platform using the financial planning software, active client forecasting results from the survey research data, the statistical analysis data, the inhouse financial planning expertise, the data from the book of record, the active client information and the current active client financial plan;
acquire, by the computing platform using the optimizer module and from the financial planning software, the active client information and the active client financial plan;
analyze, by the computing platform using the optimizer, future cashflows by scenarios;
generate, by the computing platform using the optimizer module, forecast information based on the future cashflows, the active client information and the active client financial plan;
determine, by the computing platform using the optimizer module, a financial plan value of the financial plan based on the forecast information and the inhouse financial planning expertise;
generate, by the computing platform and based on the financial plan value, a financial wellbeing score for at least one of the active client module, or the advisor module being accessed by a respective device;
determine, by the computing platform using the optimizer module, a quality of the financial plan based on the financial plan value;
modify, by the computing platform using the optimizer module, the financial plan to create a modified financial plan, in response to the quality of the financial plan being lower than a threshold;
acquire, by the computing platform using the optimizer module, approximations of the active client information and the active client financial plan, without having to send a request to the financial planning software;
determine, by the computing platform using the optimizer module, a modified financial plan value of the modified financial plan based on the approximations of modified forecast information of the modified financial plan and the inhouse financial planning expertise;
generate, by the computing platform and based on the modified financial plan value, an advanced financial wellbeing score for at least one of the active client module, or the advisor module being accessed by a respective device;
identify, by the computing platform using a machine learning algorithm, other clients that have the financial wellbeing score or the advanced financial wellbeing score that is within a threshold amount from the financial wellbeing score or the advanced financial wellbeing score of the active client, along with similar of the data from the book of record, the active client information and the current active client financial plan;
generate, by the computing platform using a machine learning algorithm, peer-based financial plan recommendations and a peer-based financial wellbeing score;
normalize, by the computing platform using a machine learning algorithm, the peer- based financial plan recommendations and the peer-based financial wellbeing score based on age and demographics; and determine, by the computing platform using a machine learning algorithm, how close the financial planning for the active client is to the other clients.

* * * * *